United States Patent [19]

Bloomberg et al.

[11] Patent Number: 5,201,011
[45] Date of Patent: Apr. 6, 1993

[54] METHOD AND APPARATUS FOR IMAGE HAND MARKUP DETECTION USING MORPHOLOGICAL TECHNIQUES

[75] Inventors: Dan S. Bloomberg; Lakshmi Dasari, both of Palo Alto, Calif.

[73] Assignee: Xerox Corporation, Stamford, Conn.

[21] Appl. No.: 794,275

[22] Filed: Nov. 19, 1991

[51] Int. Cl.$^5$ .......................... G06K 9/34; G06K 9/00
[52] U.S. Cl. ...................................... 382/9; 382/22; 382/48; 382/55
[58] Field of Search ............... 382/9, 22, 47, 48, 55; 358/452, 453

[56] References Cited

U.S. PATENT DOCUMENTS

| | | | |
|---|---|---|---|
| 4,720,750 | 1/1988 | Watanabe | 358/300 |
| 4,847,912 | 7/1989 | Tanaka et al. | 382/22 |
| 4,856,074 | 8/1989 | Nagaoka | 382/22 |
| 4,908,716 | 3/1990 | Sakano | 358/453 |
| 5,016,096 | 5/1991 | Matsunawa et al. | 358/75 |
| 5,029,224 | 7/1991 | Fujisawa | 382/22 |
| 5,048,099 | 9/1991 | Lee | 382/22 |
| 5,048,109 | 9/1991 | Bloomberg et al. | 382/50 |
| 5,058,189 | 10/1991 | Kanno | 382/61 |

OTHER PUBLICATIONS

Serra, *Image Analysis and Mathematical Morphology*, Academic Press, San Diego, 1982, pp. 34–59.

"A Method for Extracting Marked Regions from Document Images" by Hase et al., Systems and Computers in Japan, vol. 18, No. 8, 1987, pp. 77–87.

*Primary Examiner*—David K. Moore
*Assistant Examiner*—Andrew W. Johns
*Attorney, Agent, or Firm*—Oliff & Berridge

[57] ABSTRACT

An image markup detection device and method identifies and extracts markup lines and regions marked automatically or interactively by a user with an ordinary pen or pencil. Only morphological image processing operations on a scanned source image are used, resulting in the extrapolation of markup lines and marked region. The markup lines are either extracted from the image, or the background information of the image (e.g., text) is removed, leaving only the markup lines. The marked region can then be printed, transferred or otherwise processed.

22 Claims, 41 Drawing Sheets

Initially, the monocomponent developers which were introduced depended on toners which were conductive; however, this process has largely been replaced by resistive toner. The conductive toner could be charged easily in the nip by induction but has a severe drawback when transfer to plain paper is considered. The toner charge could be easily lost because of its humidity sensitivity. In addition, the transfer efficiency is lowered due to the moisture in the paper. Resistive toner, introduced by 3M in 1977 (Field, 1981), has the advantage that the toner behaves as if it were conductive in the nip for charging but after development its resistivity is high enough for transfer to plain paper.

Another variation of monocomponent development uses a toner with no magnetic additives. This system uses a donor roll covered with a material that will charge and transport the toner to the photoconductor. Although there are problems with deposition and charging of a uniform layer of toner on the donor roll, high quality prints have been demonstrated (Chang and Wilbur, 1974). Nonmagnetic systems create difficulties in toner manipulation but also make possible the lowering of toner cost, and the use of toners in other than dark colors. Ricoh is using their version of this development method in a recently announced copier machine utilizing colored toner (Repro-Jr.).

Liquid development permits, in principal, the use of the simplest hardware and offers the possibility for the highest resolution print due to the small size of its toner particles. This type of development uses a hydrocarbon dispersion of very fine toner particles that have been charged by the natural electrical double layer that arises during solvation. This mode of development has the advantages of simplicity, low cost, and does not require thermal fusing because "fixatives" can be added to the ink. There are safety and environmental concerns, however, arising from the use of liquid chemicals in an office environment which have limited the use of this technology to date.

Initially, the monocomponent developers which were introduced depended on toners which were conductive; however, this process has largely been replaced by resistive toner. The conductive toner could be charged easily in the nip by induction but has a severe drawback when transfer to plain paper is considered. The toner charge could be easily lost because of its humidity sensitivity. In addition, the transfer efficiency is lowered due to the moisture in the paper. Resistive toner, introduced by JM in 1977 (Field, 1981), has the advantage that the toner behaves as if it were conductive, in the nip for charging but-after-development its resistivity is high enough for transfer to plain paper.

Another variation of monocomponent development uses a toner with no magnetic additives. This system uses a donor roll covered with a material that will charge and transport the toner to the photoconductor. Although there are problems with deposition and charging of a uniform layer of toner on the donor roll, high quality prints have been demonstrated (Chang and Wilbur, 1974). Nonmagnetic systems create difficulties in toner manipulation but also make possible the lowering of toner cost and the use of toners in other than dark colors. Ricoh is using their version of this development method in a recently announced copier machine utilizing colored toner (Repro-Jr.).

Liquid development permits, in principal, the use of the same xerox hardware and offers the possibility for the highest resolution print due to the small size of its toner particles. This type of development uses a hydrocarbon dispersion of very fine toner particles that have been charged by the natural electrical double layer thermometer during solvation. This mode of development has the advantages of simplicity, low cost, and does not require thermal fusing because "fixatives" can be added to the ink. There are safety and environmental concerns, however, arising from the use of liquid chemicals in an office environment which have limited the use of this technology to date.

Fig. 8

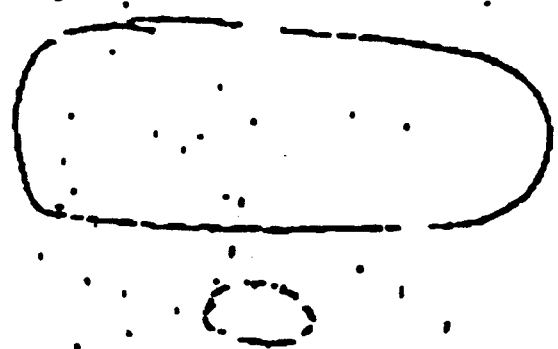
Fig. 12
Fig. 13
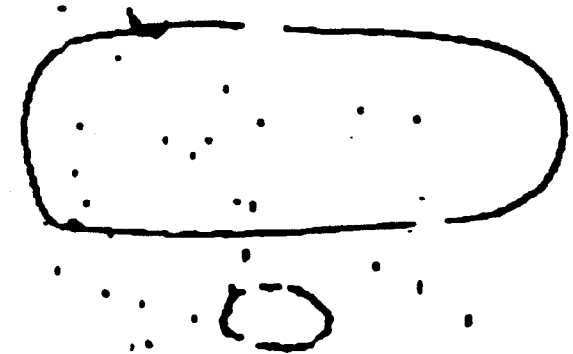

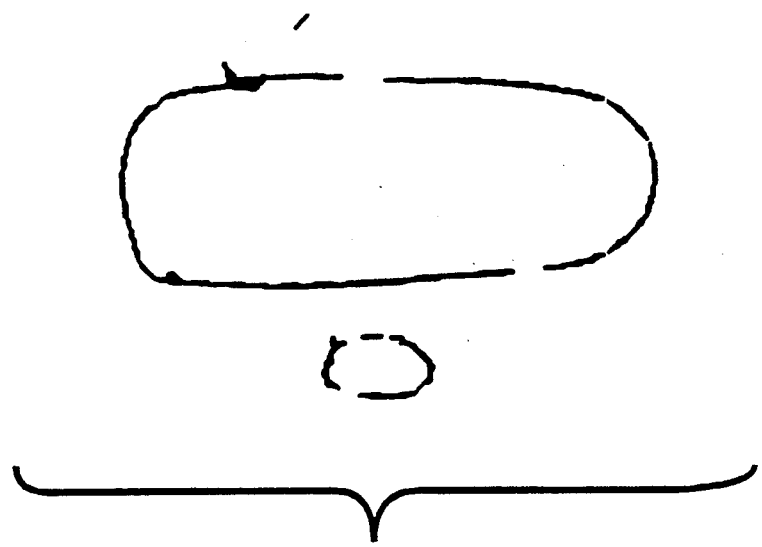
Fig. 14
Fig. 15
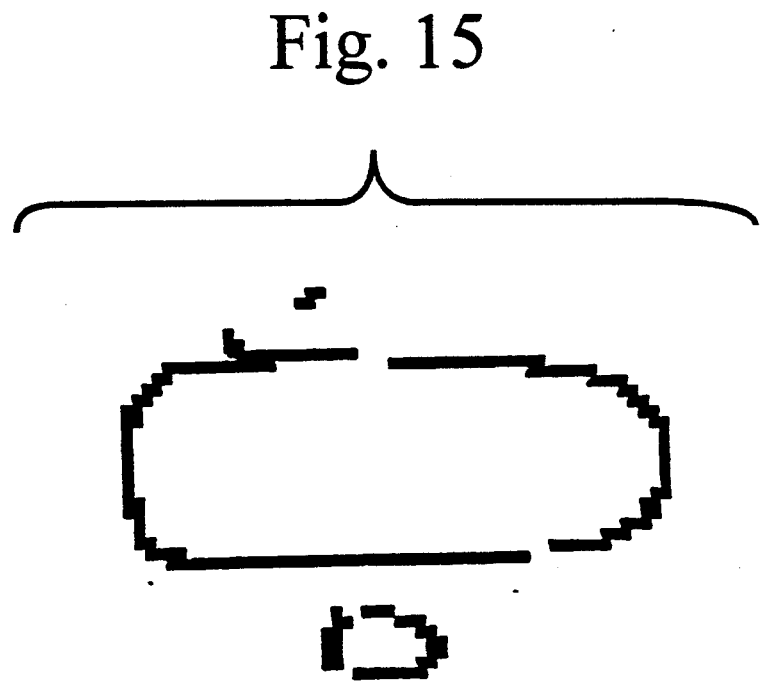

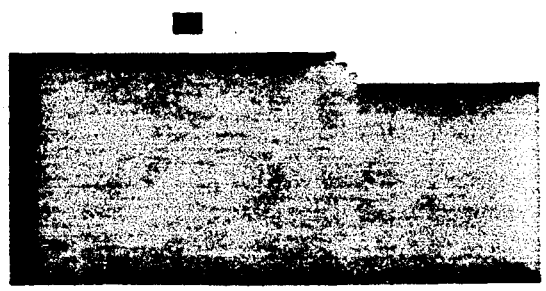
Fig. 16
Fig. 17

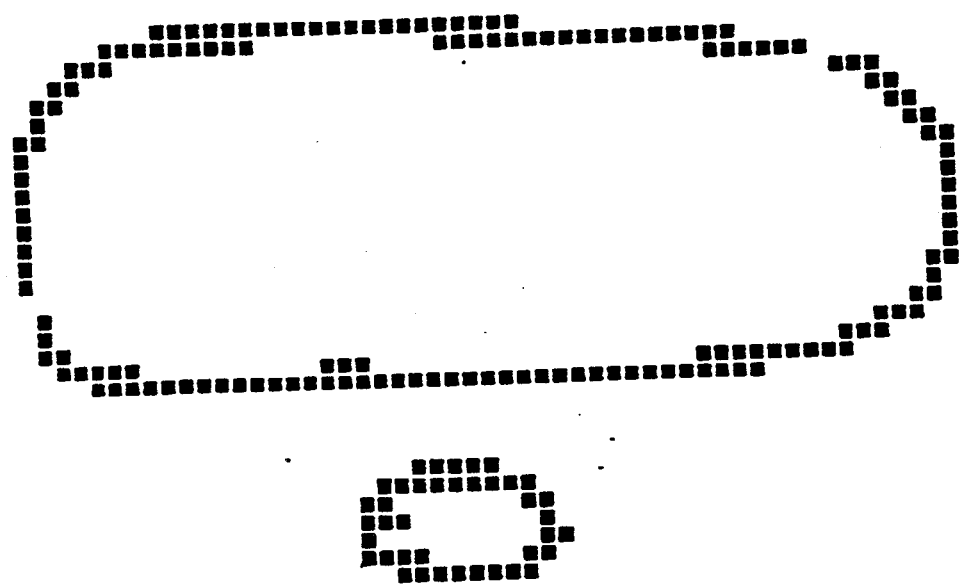
Fig. 19
Fig. 18
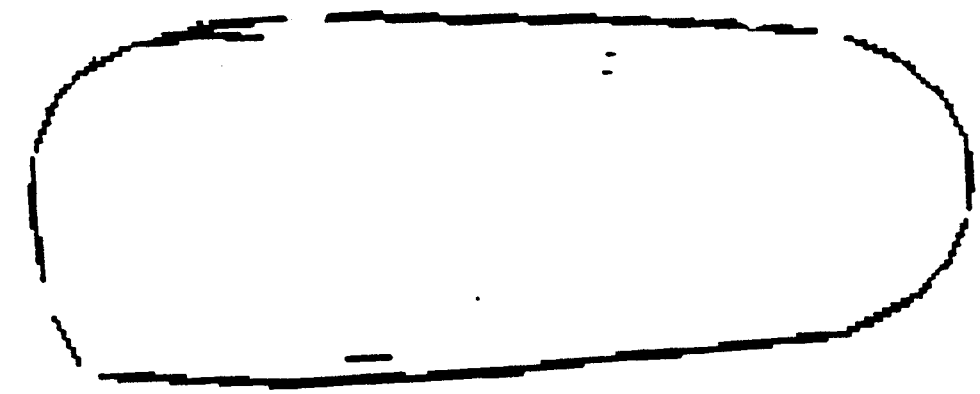
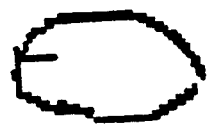

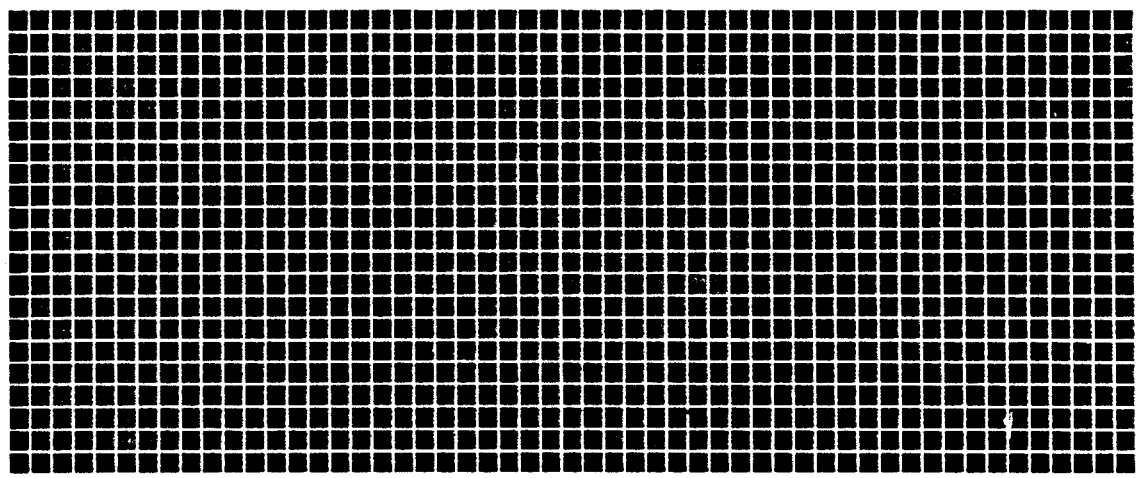
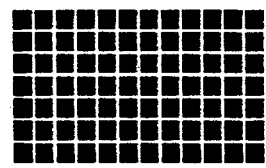
Fig. 20

...eactions and responses
...rom the PC World
...ommunity

BBS File Resources
What happened to the *PC Resource*
BBS files? Are they still available?
   *Theodore C. Trostle*
   *State College, Pennsylvania*

Viewing Multimedia
I was impressed with Richard Landry's
January column about multimedia.
When I purchased my computer, the
salesperson made it sound as if it would
do everything. But within a year it was
outdated. Landry's plain-English ex-
planation of what's out there was a
breath of fresh air. Keep the good arti-
cles coming.
   *Betty Bauer*
   *Oxnard, California*

Fig. 34

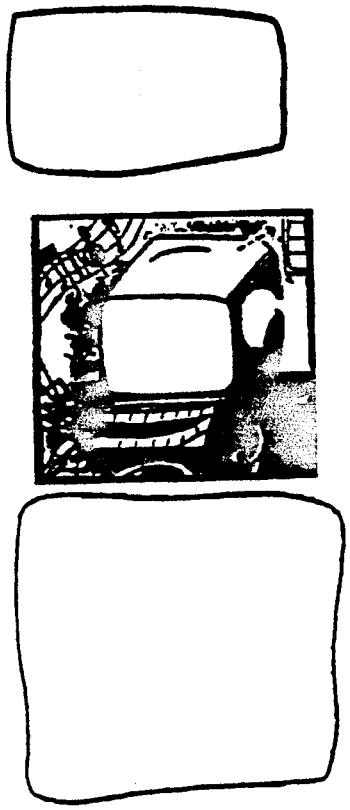
Fig. 35

METHOD AND APPARATUS FOR IMAGE HAND MARKUP DETECTION USING MORPHOLOGICAL TECHNIQUES

A portion of the disclosure of this patent document contains material which is subject to copyright protection. The copyright owner has no objection to the facsimile reproduction by anyone of the patent disclosure, as it appears in the U.S. Patent and Trademark Office patent files or records, but otherwise reserves all copyright rights whatsoever.

BACKGROUND OF THE INVENTION

Field of the Invention

This invention relates generally to image processing and more specifically to a morphological technique and apparatus for: discriminating between regions of a document which have been hand marked with an ordinary pen or other ordinary writing utensil and, regions of a document which have not been marked; and extracting a desired region.

Description of the Related Art

The ability to identify hand marks made from ordinary writing utensils, and the regions to which they are meant to refer, is commercially useful for many applications in which an electronic image of a paper document is produced with an optical image scanner. For example, regions may be marked for the purposes of:

identifying text to be sent to an optical character recognition (OCR) system, for the purpose of retrieval of the ASCII representation and identification of fields or key words for database filing;

identifying parts of an image that are not to be sent to an optical character recognition system;

identifying parts of an image that are to be stored as a bitmap image; and identifying a region of a form for which some action is to be taken.

Identification of certain portions of a document for image processing has been accomplished in the prior art by using a highlighter pen which provides a discriminated gray-scale reading between the highlighted region, the dark letter type and the light page background. However, only bright, transparent highlighter type pens can be used which provide the proper reflective characteristics to distinguish the highlighting from other marks on the document. For example, in U.S. Pat. No. 5,048,109, to Bloomberg et al., a method was disclosed for detecting regions of a document image that have been highlighted with a transparent color highlighter pen. The method requires the use of a grayscale scanner, a bandpass and a threshold filter, and binary image processing. One major drawback of the invention disclosed in U.S. Pat. No. 5,048,109 is that the image must be marked with a color highlighter pen. In the present invention, a method and apparatus are described for detecting regions of a document image that have been marked with an ordinary pen or pencil.

U.S. Pat. No. 5,029,224 to Fujisawa describes a marked region recognition apparatus which recognizes an arbitrary marked region of a document image from a mark signal which indicates whether or not there exists a mark for delineating the marked region. The marked region recognition apparatus comprises a first storing part for storing a mark signal for at least one scanning line, a second storing part for storing a coordinate in a main scanning direction where the mark region ends for each scanning line based on the mark signal stored in the first storing part, and a recognition part for recognizing an inside and an outside of the marked region and for producing a marked region signal which indicates the inside or the outside of the marked region for a present scanning line contiguous with the marked region signal of a previous scanning line, where a state of the marked region signal of a previous scanning line is obtained from the first and second storing parts.

U.S. Pat. No. 5,016,096 to Matsunawa et al. describes an apparatus capable of detecting color marking on a multicolored document, and then of performing specific image processing on the inside or outside of the region designated by the color marking. A region extraction circuit detects a region marked by a specific color marking by sending a pulse when the color marking is detected during a scan. The duration between pulses thus provides the width of the marked region.

U.S. Pat. No. 4,720,750 to Watanabe describes an image forming apparatus for an electronic copying machine which is capable of designating and erasing any part of an original document. A masking area is drawn on an area designation sheet which is then read and stored by the copying machine. The original document is then placed on the copying machine and the marked/mask area is erased, i.e., not copied, in accordance with the stored mask specification from the area designation sheet.

U.S. Pat. No. 4,908,716 to Sakano describes an image processing apparatus in which an area of a document is designated by a marking entered on the document and a portion encircled by the marking is treated as a marked area which is the subject of a trimming or a masking process. A color felt pen or the like is used to encircle a designated area of a document. Then, a mark detection circuit can detect the marking by detecting the tone of the image. The disparate reflectivity or tone of the marker pen allows marker area detection, whereupon, the marked area can be erased or maintained as desired.

SUMMARY OF THE INVENTION

It is an object of the invention to overcome the above and other disadvantages of the prior art by providing improvements to methods and apparatus for image markup detection by hand marking using a pen, pencil or other ordinary writing utensil.

It is another object of the invention to provide improvements to methods and apparatus for image markup detection of hand marks which work on binary scanned images and which utilize binary morphological image processing techniques to expedite the detection process.

It is yet another object of the invention to provide improvements to methods and apparatus for image markup detection of hand marks which utilize detection without the use of either a highlighter pen or a grayscale scanner.

It is further an object of the invention to provide improvements to methods and apparatus for image markup detection of hand marks which do not require extraneous detection circuitry to operate properly.

A method for processing a scanned first image in a digital computer for differentiating machine marks from hand marks and identifying a location of non-transparent hand marks and hand marked regions, includes the steps of: identifying and differentiating markings on the scanned first image as hand and machine marks using characteristics of the markings. The characteristics utilized include horizontal, vertical, oblique, curved and irregular shapes of the markings. Regions of the scanned first image to which the hand marks refer are identified and then reproduced without interference from the hand marks.

In one embodiment, hand marks are located by performing a plurality of morphological OPENING operations on an image using a set of structuring elements. Each OPENING operation uses a different structuring element from the set. A UNION is then taken of the results of the OPENING operations to produce an image containing substantially only the hand marks. Bounding boxes can be created around the hand marked regions of the document using the identified hand marks, or further processing can be performed to further clarify the hand marks.

In another embodiment, regions of an image entirely encircled by hand-marks are extracted from the image by using a series of flood-filling and bitwise inversion operations on the encircled regions. Alternatively, the image can be OPENED, and then CLOSED using solid structuring elements of different sizes after the image is flood-filled and bitwise inverted once. The CLOSED document image produced is then ANDed with the original image to extract the encircled portions.

Another embodiment identifies hand drawn lines in an image by OPENING the document using a structuring elements, finding bounding boxes around image units in the opened document image, and then testing the bounding boxes to identify bounding boxes which correspond to hand drawn lines. The orientation of the structuring elements can be varied depending on the type of line (e.g., vertical or horizontal) desired to be identified. Further processing can then be performed to locate and extract the test associated with the hand drawn lines.

The scope of the present invention and the manner in which it addresses the problems associated with prior art will become more readily apparent from the following detailed description when taken in conjunction with the accompanying drawings and claims.

BRIEF DESCRIPTION OF THE DRAWINGS

The invention will be described in detail with reference to the following drawings in which like reference numerals refer to like elements. The drawings are not drawn to scale, rather, they illustrate the sequential image processing of a scanned first image according to various embodiments of the claimed invention.

FIG. 5 is an example of a scanned first image of a page of a document with markup lines hand drawn with an ordinary pen.

Figure 6:
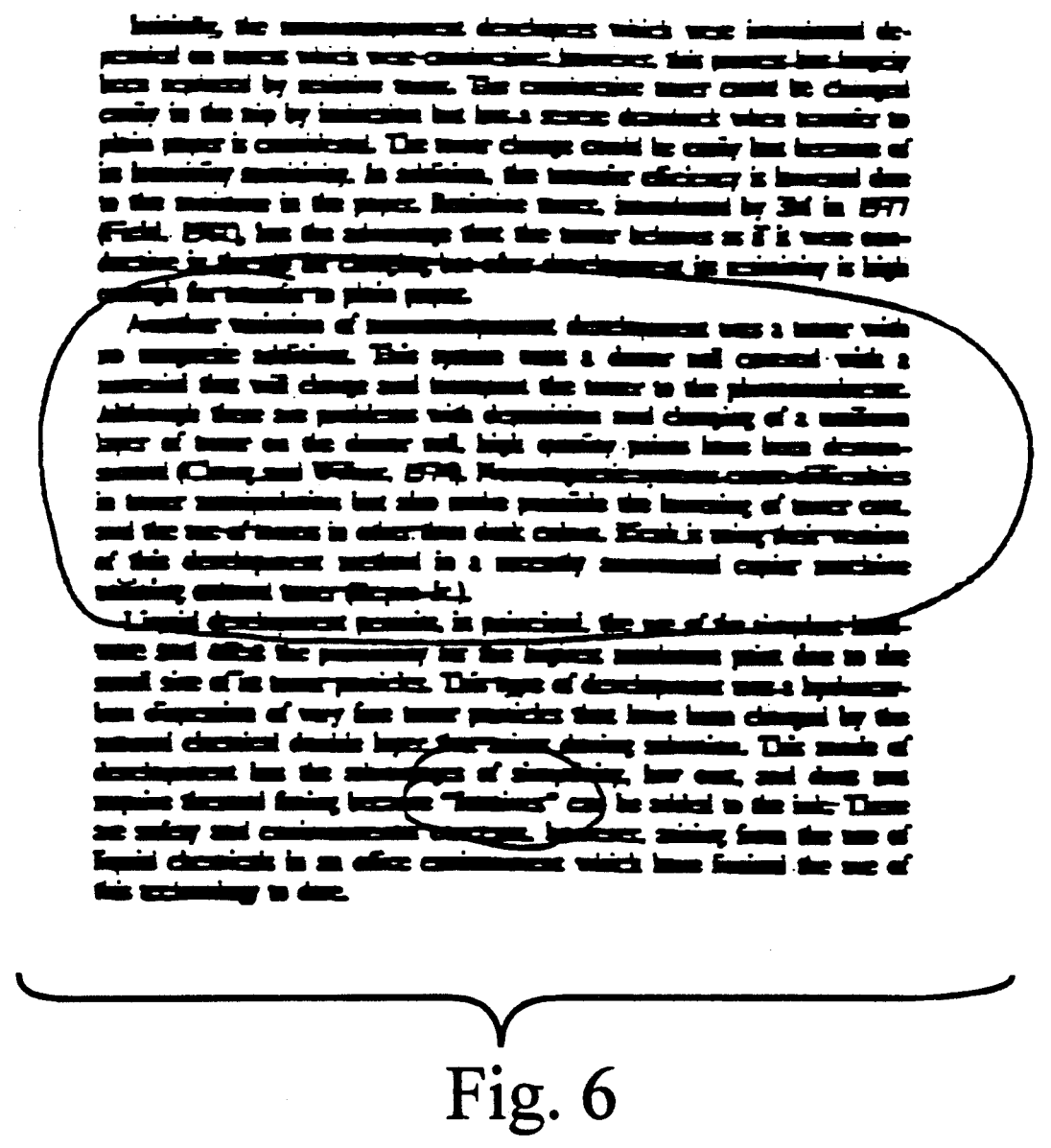

FIG. 6 is an example of a second image formed by of the indirect markup detection method of FIG. 3, the second image resulting from a morphological CLOSING operation of the first image of FIG. 5.

Figure 7:
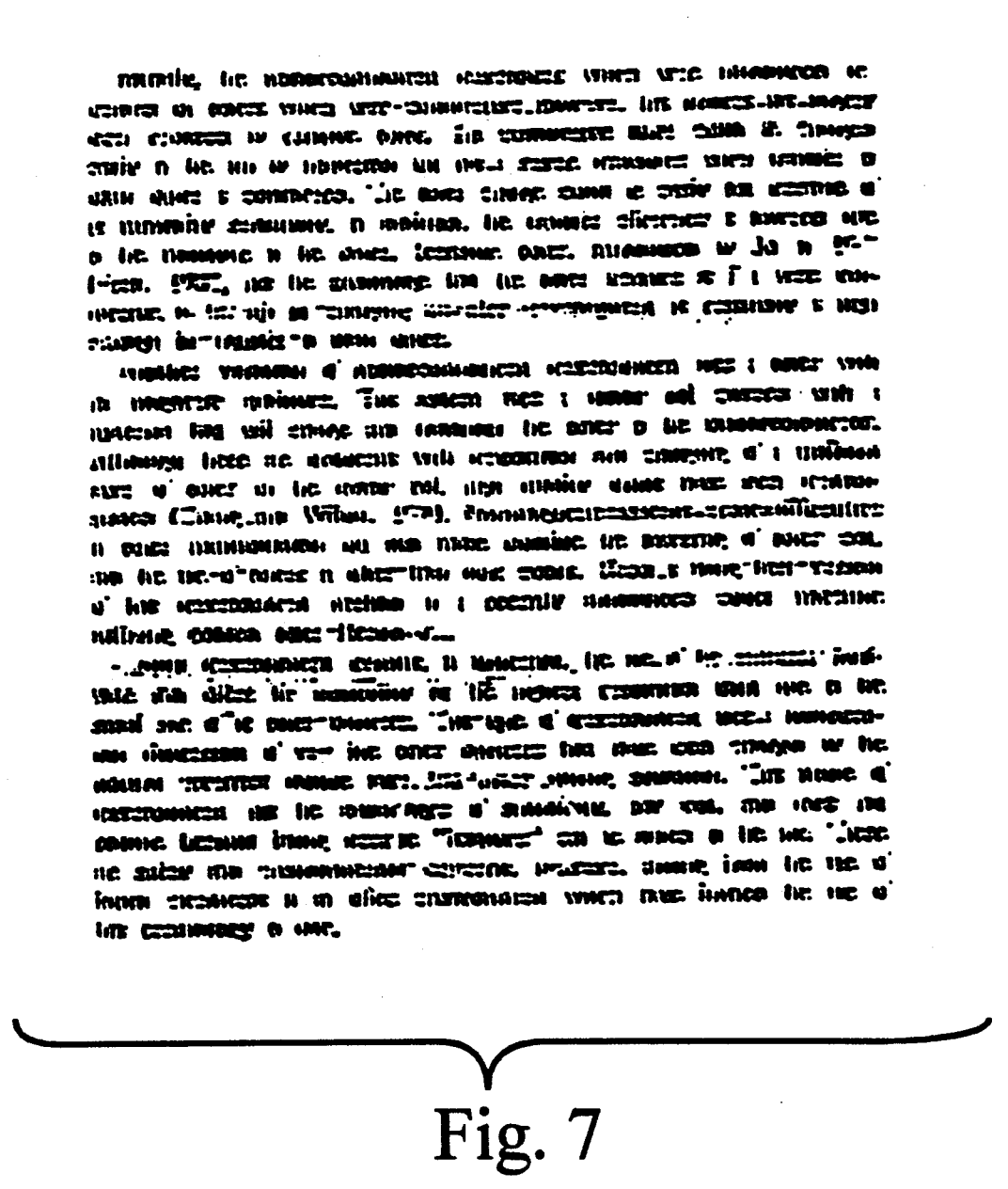

FIG. 7 is an example of a third image formed by the indirect hand markup detection method of FIG. 3, the third image resulting from XORing the first image of FIG. 5 with the second image of FIG. 6.

FIG. 8 is an example of a fourth image formed by the indirect hand markup detection method of FIG. 3, the fourth image resulting from logically ANDing the DILATION of the third image of FIG. 7 with the first image of FIG. 5.

FIG. 12 is an example of an eighth image formed by the indirect hand markup detection method of FIG. 3, the eighth image resulting from a reduction of the seventh image of FIG. 11 by a factor of four.

FIG. 13 is an example of a ninth image formed by the indirect hand markup detection method of FIG. 3, the ninth image resulting from the CLOSING of the eighth image of FIG. 12.

FIG. 14 is an example of a tenth image formed by the indirect hand markup detection method of FIG. 3, the tenth image resulting from an UNION of OPENINGS on the ninth image of FIG. 13.

FIG. 15 is an example of an eleventh image formed by the indirect hand markup detection method of FIG. 3, the eleventh image resulting from a reduction of the tenth image of FIG. 14 by a factor of two.

FIG. 16 is an example of a twelfth image formed by the indirect hand markup detection method of FIG. 3, the twelfth image resulting from filling the bounding boxes of the eleventh image of FIG. 15.

FIG. 17 is an example of a second image formed by the direct hand markup detection method of FIGS. 1 and 2, the second image resulting from an UNION of OPENINGS of the first image of FIG. 5.

FIG. 18 is an example of a third image formed by the direct hand markup detection method of FIG. 2, the third image resulting from a reduction and UNION of OPENINGS of the second image of FIG. 17.

FIG. 19 is an example of a fourth image formed by the direct hand markup detection method of FIG. 2, the fourth image resulting from a reduction of the third image of FIG. 18.

FIG. 20 is an example of a fifth image (mask) formed by the direct hand markup detection method of FIG. 2, the fifth image resulting from a bounding box fill of the fourth image of FIG. 19.

FIG. 34 is an example of a seventh image of the other preferred embodiment of a direct approach for hand markup detection.

FIG. 35 is an example of a first image of a second indirect approach for hand markup detection.

DETAILED DESCRIPTION OF THE PREFERRED EMBODIMENT

I. Definitions and Terminology

Figure 1:
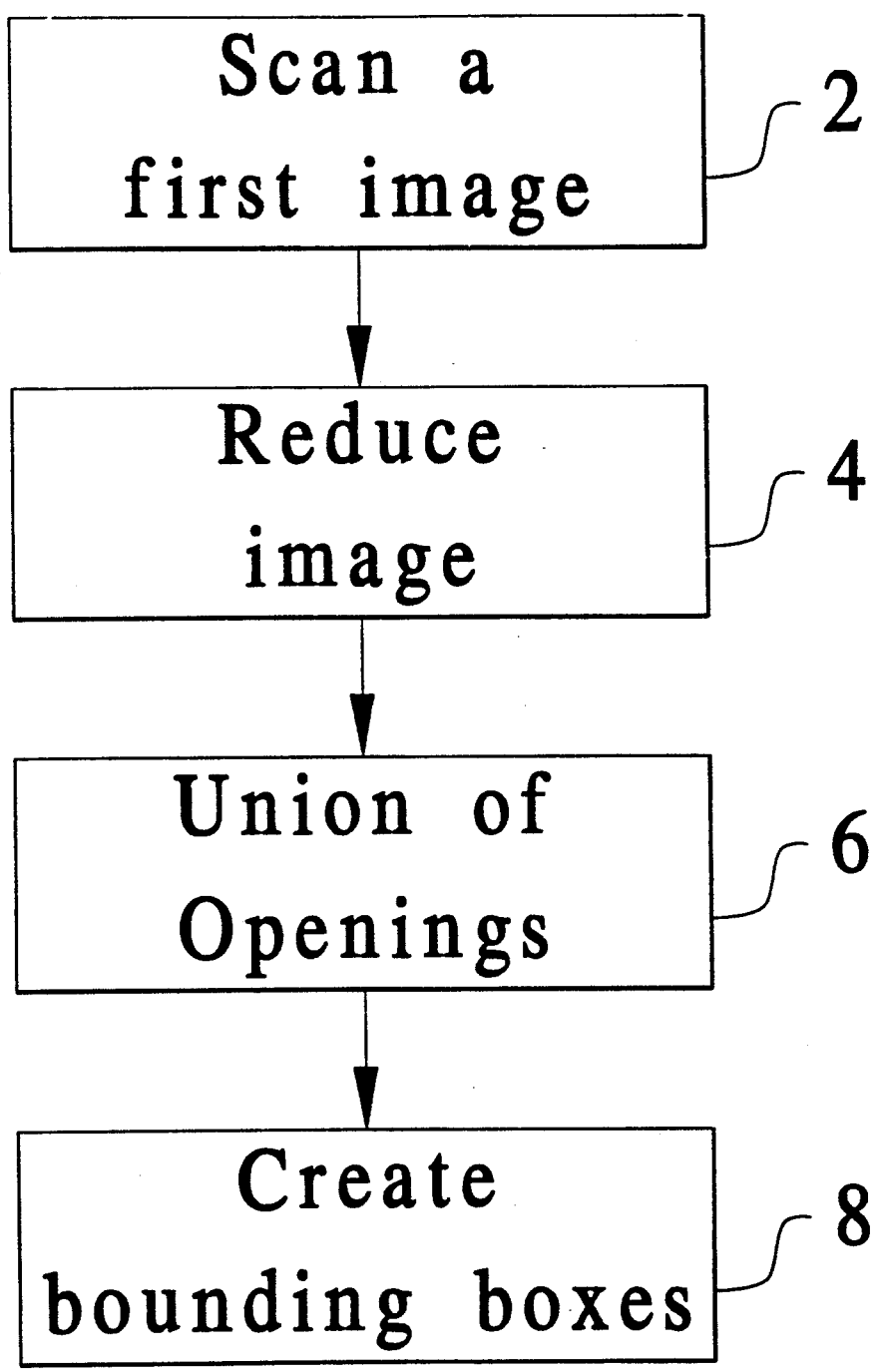
FIG. 1 is a flowchart of a first preferred embodiment according to the invention showing the steps in a direct approach to a method of identification and extraction of hand markup lines in an optically scanned first image.

The present discussion deals with binary images. In this context, the term "image" refers to a representation of a two-dimensional data structure composed of pixels. A binary image is an image where a given pixel is either "ON" of "OFF". Binary images are manipulated according to a number of operations wherein one or more source images are mapped onto a destination image. The results of such operations are generally referred to as images. The image that is the starting point of processing will sometimes be referred to as the original image or source image.

A "morphological operation" refers to an operation on a pixelmap image (a "source" image), that uses a local rule at each pixel to create another pixelmap image, the "destination" image. This rule depends both on the type of the desired operation to be performed as well as on the chosen "structuring element".

Pixels are defined to be ON if they are black and OFF if they are white. It should be noted that the designation of black as ON and white as OFF reflects the fact that most documents of interest have a black foreground and a white background. The techniques of the present invention could be applied to negative images as well. The discussion will be in terms of black on white, but the references to ON or OFF apply equally well to images which have been inverted and, therefore, the roles of these two states are reversed. In some cases the discussion makes reference to a "don't care" pixel which may be either an ON or an OFF pixel.

A "structuring element" (SE) refers to an image object of typically (but not necessarily) small size and simple shape that probes the source image and extracts various types of information from it via the chosen morphological operation. In the attached figures that show, SEs, a solid circle is a "hit", and an open circle is a "miss". The center position is denoted by a cross. Squares that have neither solid nor open circles are "don't cares"; their value in the image (ON or OFF) is not probed. A binary SE is used to probe binary images in a binary morphological operation that operates on binary input images and creates an output binary image. The SE is defined by a center location and a number of pixel locations, each normally having a defined value (ON or OFF). The pixels defining the SE do not have to be adjacent each other. The center location need not be at the geometrical center of the pattern; indeed it need not even be inside the pattern. A "solid" SE refers to an SE having a periphery within which all pixels are ON. For example, a solid 2×2 SE is a 2×2 square of ON pixels. A solid SE need not be rectangular. A horizontal SE is generally one row of ON pixels and a vertical SE is generally one column of ON pixels of selected size. A "hit-miss" SE refers to an SE that specifies at least one ON pixel and at least one OFF pixel.

AND, OR and XOR are logical operations carried out between two images on a pixel-by-pixel basis.

NOT is a logical operation carried out on a single image on a pixel-by-pixel basis.

"EXPANSION" is scale operation characterized by a scale factor N, wherein each pixel in a source image becomes an N×N square of pixels, all having the same value as the original pixel.

"REDUCTION" is a scale operation characterized by a scale factor N in a threshold level M. Reduction with scale=N entails dividing the source image into N×N squares of pixels, mapping each such square in the source image to a single pixel on the destination image. The value for the pixel in the destination image is determined by the threshold level M, which is a number between 1 and $N^2$. If the number of ON pixels in the pixel square is greater or equal to M, the destination pixel is ON, otherwise it is OFF.

"EROSION" is a morphological operation wherein a given pixel in the destination image is turned ON if and only if the result of superimposing the SE center on the corresponding pixel location in the source image results in a match between all ON and OFF pixels in the SE and the underlying pixels in the source image. An EROSION will give one pixel in the destination image for every match. That is, at each pixel, it outputs 1 if the SE (shifted and centered at that pixel) is totally contained inside the original image foreground, and outputs 0 otherwise. Note that EROSION usually refers to operations using a structuring element(s) with only hits, and more generally, matching operations with both hits and misses (often called a "hit-miss transform". The term EROSION is used herein to include matching operations with both hits and misses, thus the hit-miss transform is the particular type of EROSION used herein.

"DILATION" is a morphological operation wherein a given pixel in the source image being ON causes the SE to be written into the destination image with the SE center at the corresponding location in the destination image. The, SEs used for DILATION typically have no OFF pixels. The DILATION draws the SE as a set of pixels in the destination image for each pixel in the source image. Thus, the output image is the union of all shifted versions of the SE translated at all 1-pixels of the original image.

A "seed fill" is an operation taking as input two images, and generating a third image as the result. One of the input images is the "seed", which may be composed of a single ON pixel or of many ON pixels. The other input image is the "mask", which is typically composed of more than one image component. The two images are aligned. The result of the seed fill is to produce an image that has only those image components in which at least one seed pixel was present in the seed image. The result image is formed by starting with the seed pixels and growing each image region until it has filled the corresponding image component in the mask. This can be done morphologically (the "fillclip" operation, where the result image is formed by starting with the seed and alternatively dilating it and ADDing it with the "mask", until it stops changing) or by seed fill or "flood fill" techniques (where those image components containing a seed are erased—by converting ON pixels to OFF pixels—and then reconstructed using XOR with the original image).

"FillClip" is a morphological operation where one image is used as a seed and is grown morphologically, clipping it at each growth step to the second image. For example, a fillClip could include a DILATION followed by logically ANDing the DILATION result with another image.

"OPENING" is a morphological operation that uses an image and a structuring element and consists of an EROSION followed by a DILATION. The result is to replicate the structuring element in the destination image for each match in the source image.

"CLOSING" is a morphological operation using an image and a structuring element. It includes a DILATION followed by an EROSION of the image by a structuring element. A CLOSE of an image is equivalent to the bit inverse of an OPEN on the (bit inverse) background.

An UNION is a bitwise OR between two images. An "intersection" is a bitwise AND between two images.

"BLURRING" is a DILATION using a structuring element(s) composed of two or more hits.

A "mask" refers to an image, normally derived from an original or source image, that contains substantially solid regions of ON pixels corresponding to regions of interest in the original image. The mask may also contain regions of ON pixels that do not correspond to regions of interest.

"Text" refers to portions of a document or image which comprises letters, numbers, or other language symbols including non-alphabetic linguistic characters such as ideograms and syllabry in the oriental languages.

The various operations defined above are sometimes referred to in noun, adjective, and verb forms. For example, references to DILATION (noun form) may be in terms of DILATING the image or the image being DILATED (verb forms) or the image being subjected to a DILATION operation (adjective form). No difference in meaning is intended.

Morphological operations have several specific properties that simplify their use in the design of appropriate algorithms. First, they are translationally invariant. A sideway shift of the image before transforming does not change the result, except to shift the result as well. Operations that are translationally invariant can be implemented with a high degree of parallelism, in that each point in the image is treated using the same rule. In addition, morphological operations satisfy two properties that make it easy to visualize their geometrical behavior. First, EROSION, DILATION, OPEN and CLOSE are "increasing", which means that if image 1 is contained in image 2, then any of these morphological operations on image 1 will also be contained in the morphological operation on image 2. Second, a CLOSE is extensive and OPEN is antiextensive. This means that the original image is contained in the image transformed by CLOSE and the image transformed by OPEN is contained in the original image. The DILATION and EROSION operations are also extensive and antiextensive, respectively, if the center of the structuring element is contained within the original image.

The OPEN and CLOSE operations also satisfy two more morphological properties:

(1) The result of the operation is independent of the position of the center of the structuring element.
(2) The operation is idempotent, which means that reapplying the OPEN or CLOSE to the resulting image will not change it.

An "image unit" means an identifiable segment of an image such as a word, number, character, glyph or other unit that can be extracted reliably and have an underlying linguistic structure.

II. Overview of the Method

One problem addressed by the invention is identifying regions (i.e., image segments) on a page that have been marked by hand with an ordinary pen (or pencil). The markings can consist of horizontal or vertical lines, or of "circular" marks (either open lines, segments of curved lines, or combinations of the two). Since all markings are by hand, the straight lines will not have the same straightness or smoothness of machine-printed rules, or hand markings using a straight-edge.

The image interpretation problem can be broken into several sub-problems;

(1) identifying the markings themselves;
(2) identifying the regions of the image to which these markings refer; and
(3) reproducing those regions without interference from the markings themselves.

A method for finding word boxes or bounding boxes around image units is to close the image with a horizontal SE that joins characters but not words, followed by an operation that labels the bounding boxes of the connected image components (which in this case are words). The process can be greatly accelerated by using 1 or more threshold reductions (with threshold value 1), that have the effect both of reducing the image and of closing the spacing between the characters. The threshold reduction(s) are typically followed by closing with a small horizontal SE. The connected components labeling operation is also done at the reduced scale, and the results are scaled up to full size. The disadvantage of operating at reduced scale is that the word bounding boxes are only approximate; however, for many applications the accuracy is sufficient. The method described above works fairly well for arbitrary test fonts, but in extreme cases, such as large fixed width fonts that have large inter-character separation or small variable width fonts that have small inter-word separation, mistakes can occur. The most robust method chooses a SE for closing based on a measurement of specific image characteristics. This requires adding the following two steps:

(1) Order the image components in the original or reduced (but not closed) image in line order, left to right and top to bottom.
(2) Build a histogram of the horizontal intercomponent spacing. This histogram should naturally divide into the small inter-character spacing and the larger inter-word spacings. Then use the valley between these peaks to determine the size of the SE to use for closing the image to merge characters but not join words.

A. Identifying the Hand Markings

Sub-problem (1) of the image interpretation problem involves identifying the markings. Several salient characteristics of the hand markings can be used to identify the markings. The characteristics include:

(i) long horizontal, vertical, and oblique straight line segments, where "long" is relative to the size of machine marks, such as text characters;
(ii) segments that are not exactly straight, having some curviness; and
(iii) segments that are not horizontal or vertical, relative to the text in the image.

If the document consists only of text, without rules or line graphics, then it is not necessary to distinguish between hand markings and machine lines, and a probing of the image based on the length of the straight line segments is adequate to separate the hand markings from text. ("Probing" is typically done morphologically, optionally with reduction beforehand, using either an EROSION or an OPENING).

If the image may contain horizontal or vertical les, it is necessary to distinguish the machine marks from the hand marks. In this case, the best results are obtained by utilizing all of the above characteristics. One method for distinguishing machine marks from hand marks is as follows:

(a) Deskew the image as described in a copending patent application entitled "Method and Apparatus for Identification of Document Skew" to Bloomberg et al., Ser. No. 448,774, filed Dec. 8, 1989, said copending patent application herein being incorporated in its entirety.

(b) Do an OPENING of the image for long horizontal line segments. This will project out both machine-printed horizontal lines, and nearly horizontal handwritten line segments.

(c) For each connected component thus extracted, determine the width W, height H, and number N of ON pixels within a bounding box.

(d) Using the width, height and number of ON pixels within the bounding box, determine if the image segment is machine or hand made. This can be done by constructing factors such as: the ratio W/H (for horizontal segments); the ratio N/(WH) (which designates a fractional area of ON pixels within the bounding box); the ratio $N/(W*(H-c))$ (for horizontal segments), where c is a constant with workable values of about 2; the ratio $N/(H*(W-c))$ (for vertical segments), where workable values for c are about 2; and comparing these with thresholds. If the constant c is 0, the special case occurs where the factor is N/(WH). The reason for generalizing the factor N(WH) with the constant c is to compensate for jagged marks and slight misalignment on machine printed lines. For example, by removing 2 or so lines from the width, $N/(W*(H-c))$ should be approximately 1.0 for machine printed lines, whereas it would be significantly smaller than 1.0 for handwritten marks.

B. Identifying the Marked Regions

Sub-problem (2) of the image interpretation problem provides for identifying regions of the document image to which the handwritten marks refer. The handwritten marks identified in sub-problem (1) are further processed to identify a target part of the document image.

A fill operation, starting with the identified segments as "seeds", and filling into the connected component of the image of which the identified segments are a part, will provide the connected hand marking. This marking can be an underline, a sideline, a circle, etc.

The asperity ratio (width to width) of the bounding box of the (filled) connected component can then be compared with thresholds to determine if the marks are underlines (large width/height), sidelines (large height/width), or circles (both width and height are larger than a minimum threshold value).

Underlines typically refer to the image units directly above them; image unit segmentation with association of the neighboring underline is appropriate. Thus, for example, the document image can be horizontally CLOSED (or DILATED) so that the letters within the image unit are merged; thus, when extracting by connected components, the entire image unit is obtained.

Sidelines typically refer to a block of the document image to the right of the sideline if the sideline is on the left side of the image, and vice versa.

Circles typically refer to a part of the document image that is encircled. Encircled means any marking that is intended to demarcate by enclosure, or near enclosure. The circle need not be closed, since the demarcated region, including the hand marking, may be determined by several methods as follows.

(a) Use a bounding box for the connected component. This is effective for isolated regions of the document image that are entirely circled, but it does not work well for circled marks that occur within a text block, for example, because unintended text within the bounding box but outside the contour will be lifted as well.

(b) Fill within the circled region. This is effective only when the region is CLOSED. There are several ways to test the connectedness of the region. A very simple method is to use a flood fill in either of two directions (filling from the inside or the outside). For a flood fill start with the extracted region of the image given by th bounding box of the connected component (perhaps using an image that has been slightly expanded beyond the bounding box, using OFF pixels outside the bounding box), either:

i) fill the background (OFF) pixels from the inside, and check if the fill escapes the circle, or fill the background pixels from the outside, and test if the fill penetrates the circle.

(c) Alternate direction CLOSING is effective for circles that are not closed contours. This method isolates the connected component and closes it along the smallest direction with a structuring element of size comparable to that dimension. Then close in the orthogonal direction with a structuring element of reasonable size (depending on the asperity of the connected component). Close again in the original direction and the result is a solid mask spanning the connected component. This can all also be done at reduced scale for efficiency.

C. Reproducing the Marked Regions

Sub-problem (3) of the image interpretation provides for reproducing demarcated regions without interference from the hand markings. Problems can arise when the hand marking is connected to some of the material that is to be extracted. Due to such connections, it is generally not possible to remove only the pixels produced by the hand marking from the extracted image. Nevertheless, solutions that work reasonably well do exist.

One method according to the invention is extract ing those pixels that are believed to constitute the hand marking, and to XOR or set SUBTRACT them from the extracted image. If boundary noise pixels on the hand markings are not extracted, then these will remain in the image after the XOR or set SUBTRACTION; consequently, an OPENING with a structuring element needs to be used to remove them.

For sidelines there is usually no problem, since the sidelines are typically unconnected with the machine printed material. Underlines can touch the material above them. Consequently, an underline connected component should not be removed, since (for example) the connected component may include one or more characters of the text located above the underline. Instead, the underline should be extracted by horizontal OPENINGS alone without filling. The horizontal OPENING will not include boundary noise pixels. These noise pixels can be retrieved in one of two ways:

(i) Either dilate the extracted underline using a small vertical structuring element. The DILATED underline will typically cover the boundary noise pixels, even when the structuring element is very small (say, 3 to 5 pixels high, with the center position in the center of the structuring element); or (ii) post-process the extracted (say, text) components by OPENING with a small structuring element to remove the noise.

As mentioned above, underlines are typically applied to image units that represent words, so the processing that is intended to lift the material above the underline should be word-oriented. After the image unit is extracted, the pixels representing the underline can be subtracted.

Circled regions are the most varied. Assume now that the demarcated region, including the hand markings, have been lifted out by the methods above. If the clipped region is an isolated part of the document image not touched by the circle, the entire region can be extracted, followed by XORing or SUBTRACTING the pixels of the circle component. If the hand marking touches machine printed text, the following options are available:

(i) Remove the hand marking connected component, which would include all characters that touch it.

(ii) Identify the hand marking pixels by a UNION of OPENINGS using structuring elements that represent line segments at a set of orientations (typically eight: 0, 22.5, 45, 67.5, 90, 112.5, 135, 157.5 degrees). The size of the structuring elements is set by the criterion that they must be large enough to avoid including ordinary text characters, but small enough to get most of the hand marking. The image which results from the UNION of OPENINGS image is then DILATED by a small isotropic structuring element (say, a $3\times3$ or $5\times5$ brick), and the result is XORed or SUBTRACTed from the lifted image.

To improve robustness of the above operations, the bitmap of each lifted region should be processed independently. Border pixels may need to be added to avoid boundary effects when CLOSING an image. By processing each region independently, the regions cannot interfere with each other (for example, a large CLOSING will not bridge two different regions). Further, the structuring elements chosen to process a region can be tailored to the dimensions and characteristics of each region, as in the above method for extracting regions demarcated by open circles.

III. Direct Approach

The methods and apparatus of the present invention permit regions of a document hand marked with an ordinary pen or pencil to be identified, even if marked through lines of text. Two characteristics of markup lines can be used in identifying and extracting those markup lines from a document image. First, the lines can be identified as being long lines and second, the markup lines can locally appear to be composed of straight line segments whereas text for example has local regions of high curvature.

A direct approach to the identification of markup lines, and subsequent processing of hand marked regions, extracts those parts of a document image that are composed locally of long straight lines, effectively removing the markup lines from the document image. The direct approach method is shown in a first preferred embodiment in FIG. 1 where a first image of a document, as shown for example in FIG. 5, is scanned in step 2. The first image of FIG. 5 represents a scaled image at 150 pixels/inch. The first image is threshold reduced 2× in step 4 using a threshold of 2 to obtain a first image scaled at 75 pixels/inch. A morphological UNION of OPENINGS on the reduced first image of FIG. 5 is taken in step 6, using a set of eight structuring elements as shown in FIGS. 27A-H, and forming a second image as shown in FIG. 17. The structuring elements of FIG. 27A-H each have a length 9 and as a set they represent eight lines in different orientations. By taking a UNION of the OPENINGS, any pixels that lie within a part of the reduced first image that entirely cover at least one structuring element pattern, are accepted. The result in FIG. 17 is quite clean with strong markup lines. The bounding boxes are created as shown in step 8 and filled, forming a mask of the markup region as shown in FIG. 20.

Figure 2:
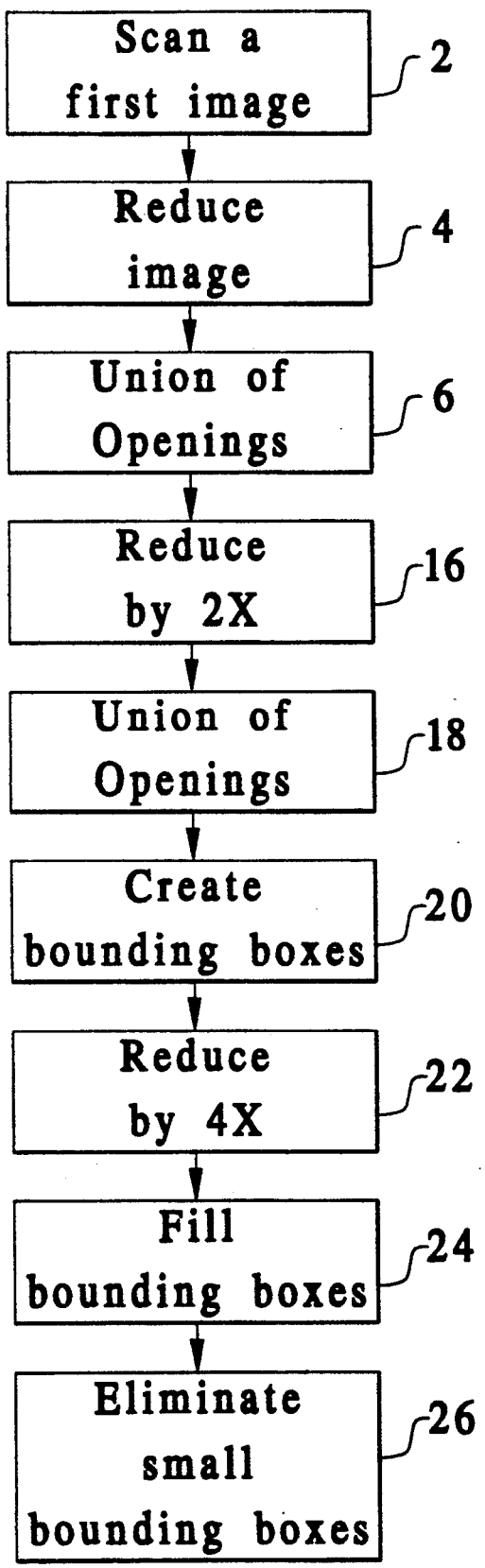
FIG. 2 is a flowchart of a second preferred embodiment according to the invention showing the steps of another direct approach to a method of identification and extraction of hand markup lines in an optically scanned first image.

FIG. 2 shows a second preferred embodiment of an image markup method using the direct approach to the identification and extraction of hand marked regions. The first three steps of the method are identical to steps 2, 4 and 6 in FIG. 1. Those first three steps include scanning a first image (from FIG. 5) in step 2, reducing the image in step 4, and taking a UNION of OPENINGS of the reduced first image using the set of eight structuring elements shown in FIGS. 27A-H in step 6. The departure from FIG. 1 occurs in step 16 of FIG. 2 where the second image shown in FIG. 17 is reduced by 2× to 38 pixels/inch, using a threshold value of 1. The reduced second image is processed by taking a UNION of the same set of OPENINGS used in step 6, i.e., the set of structuring elements shown in FIGS. 27A-H, to form a third image as shown in FIG. 18. Since the second preferred embodiment occurs at a 2× reduction compared with the reduction in step 4 of the first embodiment, the structuring elements are effectively twice as long as they were in the prior step 4 UNION. As seen from FIG. 18, the result of the morphological operations in providing the third image is a very clean image, effectively showing only markup lines. Bounding boxes are constructed as shown in Step 20, and then the third image is reduced by 4× in step 22 by using two 2× reductions, each with threshold 1, creating a fourth image with a resolution of 9.5 pixels/inch as shown in FIG. 19. A bounding box fill of the fourth image in step 24 results in a fifth image (mask) as shown in FIG. 20. Small bounding boxes may be eliminated in step 26, providing error control for stray marks and extremely small enclosures that would not likely be purposely marked.

IV. Circle Extraction Technique

Another preferred embodiment for circle extraction is illustrated in of FIGS. 28-34 as and described below. Script text for the actual interpreted calls is located in APPENDIX A.

Script of C programming code, located in Appendix B, has been implemented to determine whether marks on an image are handwritten or machine made.

V. Preferred Method for Circle Extraction

Figure 28:
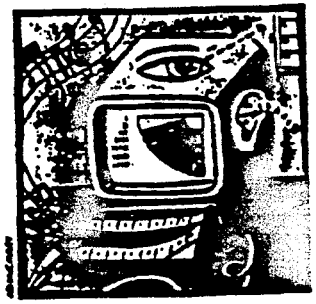
FIG. 28 is an example of a first image of another preferred embodiment of a direct approach for hand markup detection.
Figure 29:
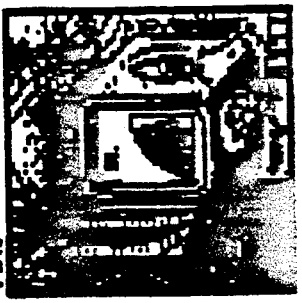
FIG. 29 is an example of a second image of the other preferred embodiment of a direct approach for hand markup detection.
Figure 30:
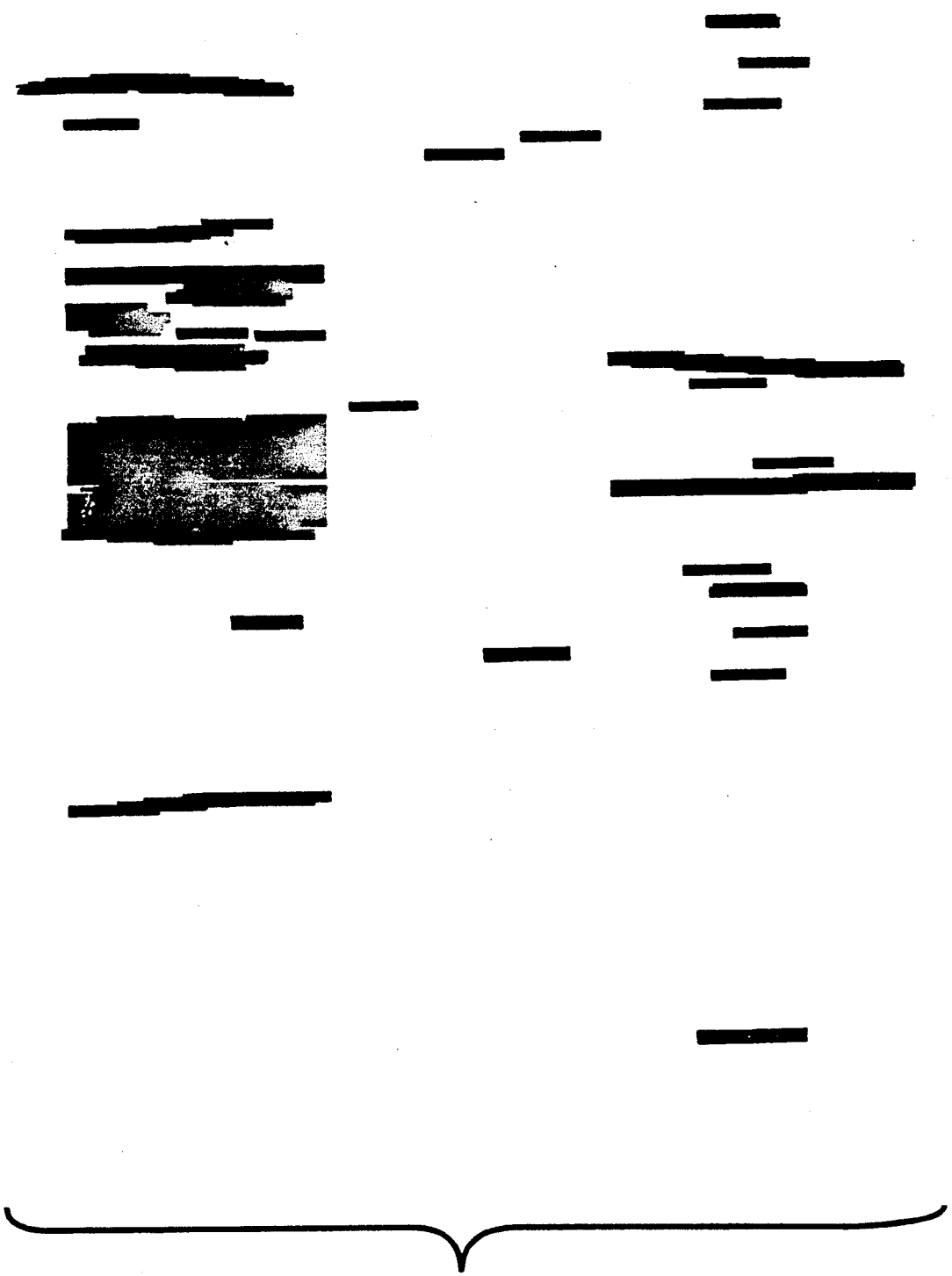
FIG. 30 is an example of a third image of the other preferred embodiment of a direct approach for hand markup detection.
Figure 31:
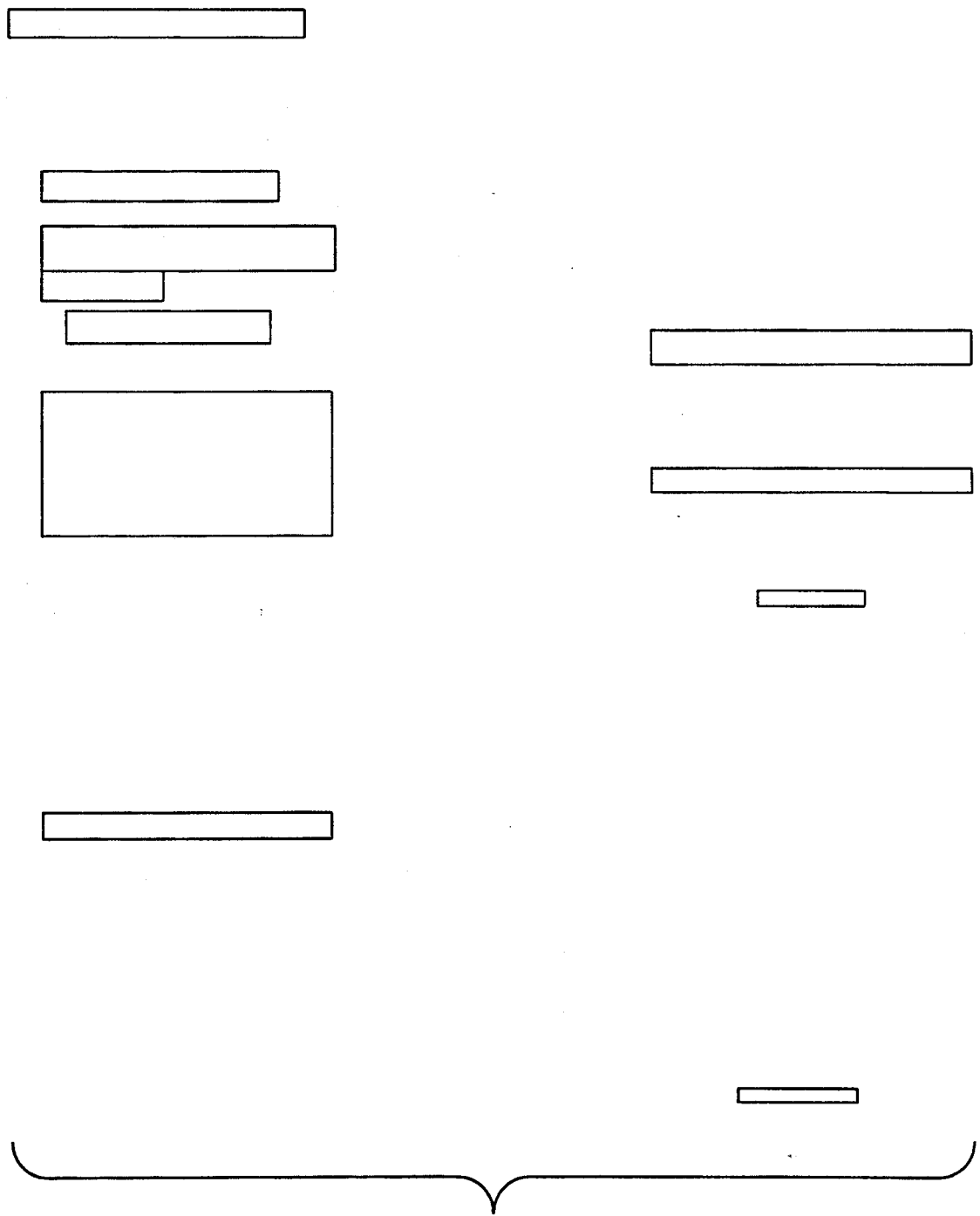
FIG. 31 is an example of a fourth image of the other preferred embodiment of a direct approach for hand markup detection.
Figure 32:
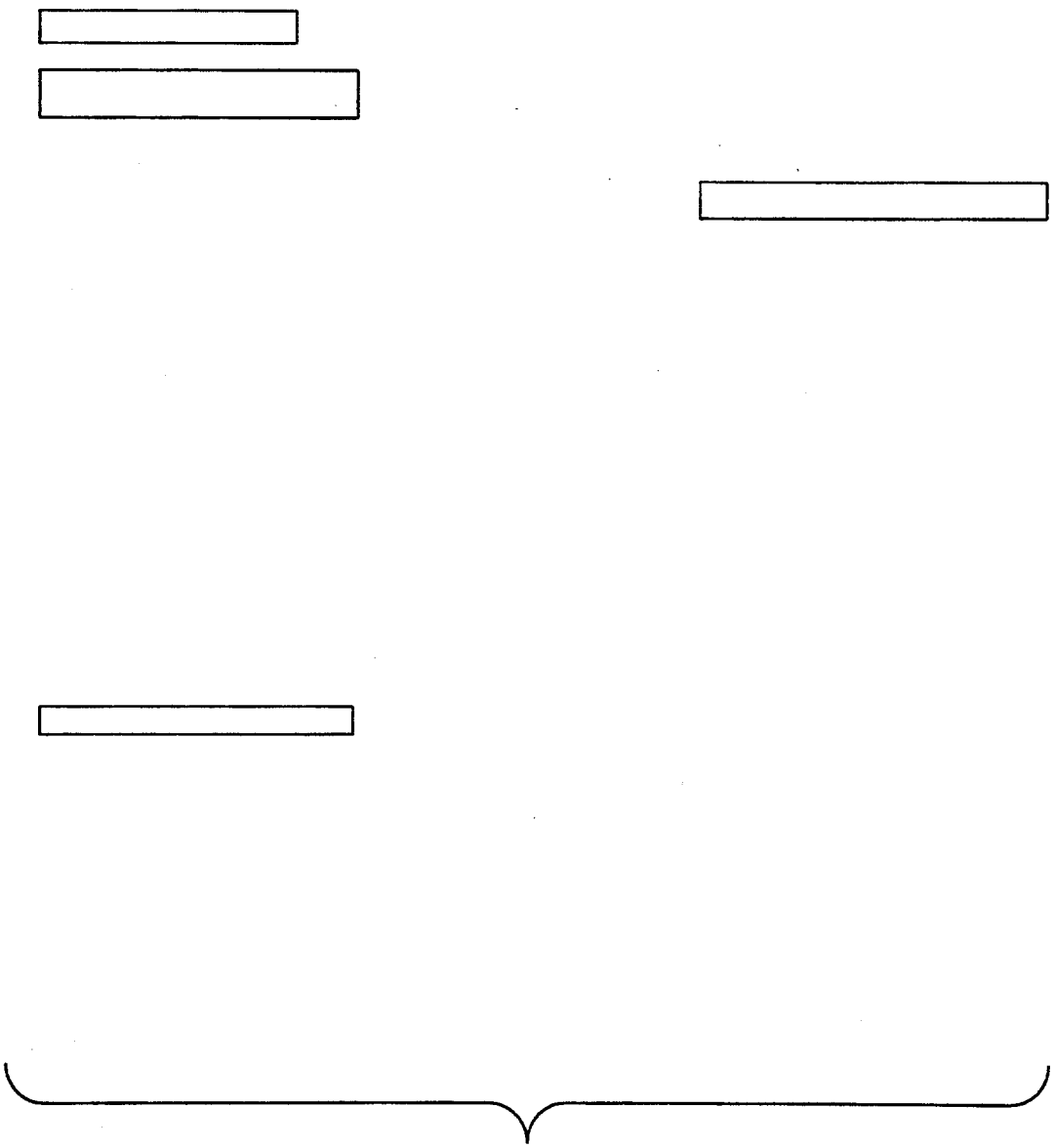
FIG. 32 is an example of a fifth image of the other preferred embodiment of a direct approach for hand markup detection.
Figure 33:
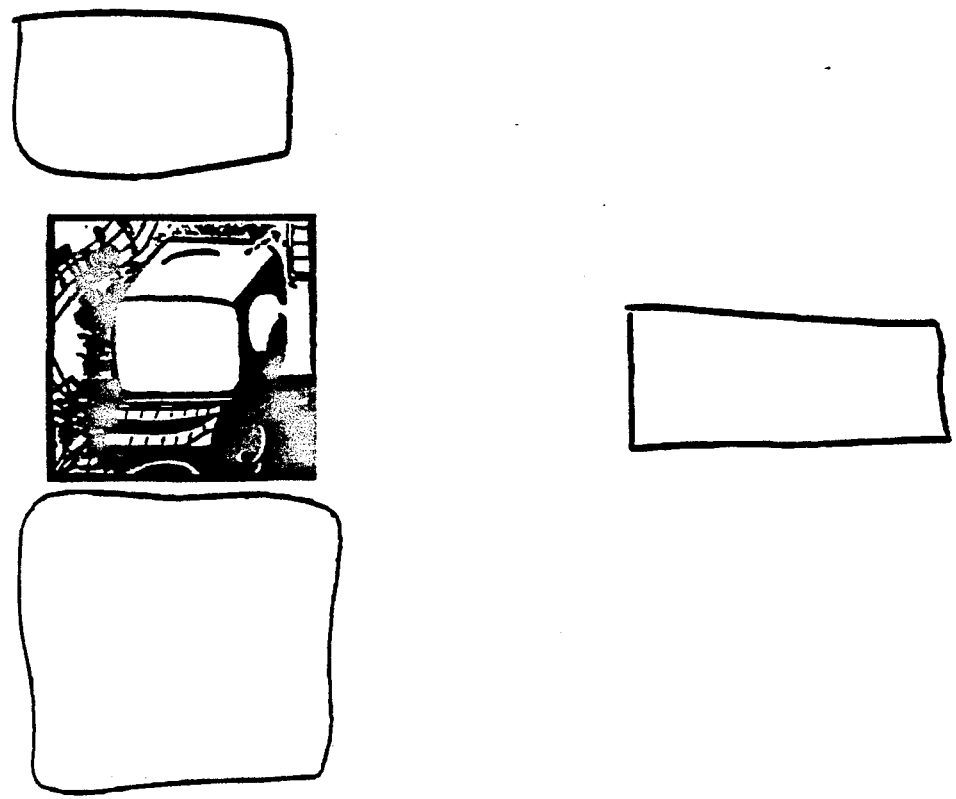
FIG. 33 is an example of a sixth image of the other preferred embodiment of a direct approach for hand markup detection.

First, the original image shown in FIG. 28 is deskewed. The deskew procedure is optional, but it helps when using the handLineDiscrimination procedure of APPENDIX B. A 4× reduction of the first image of FIG. 28 is performed and the result is shown in FIG. 29 (although a 2× reduction is also acceptable). The reduction procedure is optional, but it helps improve efficiency, since many of the subsequent operations can be performed much faster on a reduced image. In FIG. 30, horizontal lines have been extracted with an OPENING (or less satsifactorily by an EROSION) using along horizontal structuring element. The structuring element used in this case was 20 pixels long, which is reasonable for images with resolution of 40-80 pixels/inch which corresponds to a reduction between 4× and 8× from typical scanning resolution of 300 pixels/inch. If the hand line is weak, i.e., thin, and slanted, it may not be possible to extract a long horizontal line. To handle thin lines, a small vertical dilation can be done before the horizontal OPENING to make the lines thicker. Furthermore, another DILATION can be done after horizontal line extraction to join slightly separated components. In FIG. 31, the connected components have been found and short lines have been removed using any number of conventional techniques. FIG. 31 shows bounding boxes for those components remaining after the short lines have been culled. In FIG. 32, handwritten lines are selected. Possible discriminating factors (both used in this example) include the asperity ratio (width to height) and the fraction of the bounding box containing ON pixels. In FIG. 33, the handwritten marks are extracted at full resolution as follows.

(1) Expand the segments selected in FIG. 32 to full resolution.
(2) AND expanded segments from FIG. 32 with the original image of FIG. 28.
(3) Use the result of the ANDing operation as a seed in a filling operation, with the original image of FIG. 28 as the clipping mask, to generate the entirety of the original hand marks.

The contents of regions delineated by the hand marks (as shown in FIG. 34) have been obtained by (1) determining the bounding boxes of the connected components, (2) extracting the bounding box regions from the original image, and (3) SUBTRACTING the hand marks (shown in FIG. 33). This method can be used even if the hand marks do not formed a closed curve.

Figure 46:
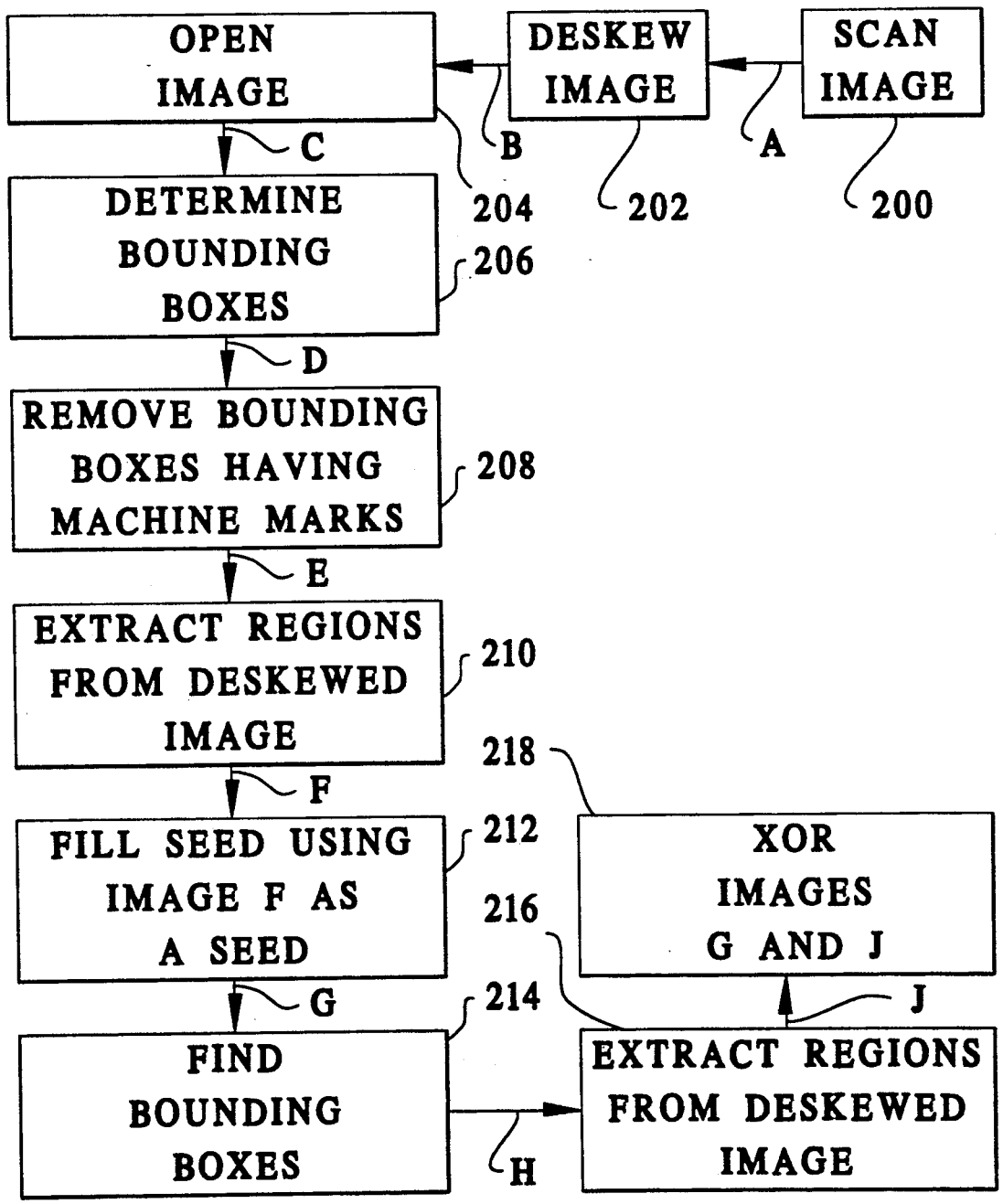
FIG. 46 is a flowchart of a method for extracting regions of a document image encircled by non-transparent hand marks.

A general approach to the method of extracting encircled regions of a document image which have been hand marked with an ordinary pen or pencil (excluding a highlighter pen) is illustrated in the flowchart of FIG. 46. An image is scanned in step 200 and the resultant document image A is deskewed in step 202. The deskewed image B is then OPENed in step 204 using at least one horizontal or one vertical structuring element. The OPENed image C then has either horizontal or vertical image segments according to the type of structuring element used in step 204. Bounding boxes are determined about image units in step 206 resulting in a data structure D which includes bounding rectangles of horizontal or vertical line segments. In step 208, bounding boxes are removed from the data structure D which include only machine markings, resulting in a data structure E. The regions represented by the data structure E in step 21 are extracted from the deskewed image B, resulting in an image F of hand drawn line segments. The hand drawn line segments of image F are used as a seed in step 212 for a seed fill operation using image B as a clipping mask. The result of the seed fill operation is an image G of filled circles representing the hand drawn marks. In step 214, bounding boxes are found around the filled circles of image G, resulting in a data structure H which includes bounding rectangles of hand drawn marks. The regions represented by the data structure H are then extracted from the deskewed image B in step 216, resulting in an image J containing hand drawn marks and contents. In step 218, image J (containing hand drawn marks and contents) is exclusive-ORed with image G. The result of the XOR is an image containing only contents of hand drawn regions, i.e., no hand drawn marks remain in the image.

V. Indirect Approach

Figure 3:
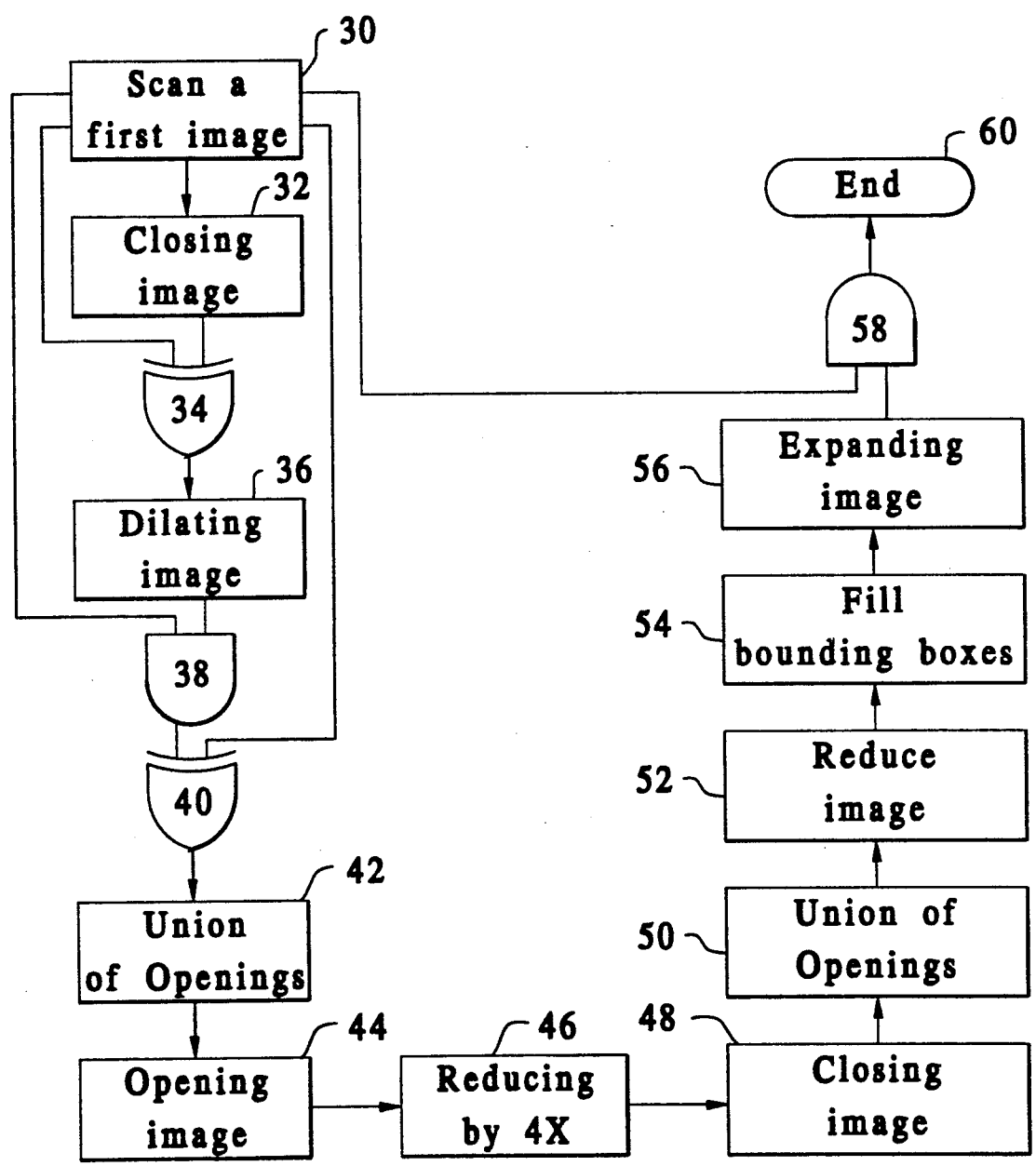
FIG. 3 is a flowchart utilizing binary logic symbols for a third preferred embodiment according to the invention showing the steps of an indirect approach to a method of identification and extraction of hand markup lines in an optically scanned first image.
Figure 9:
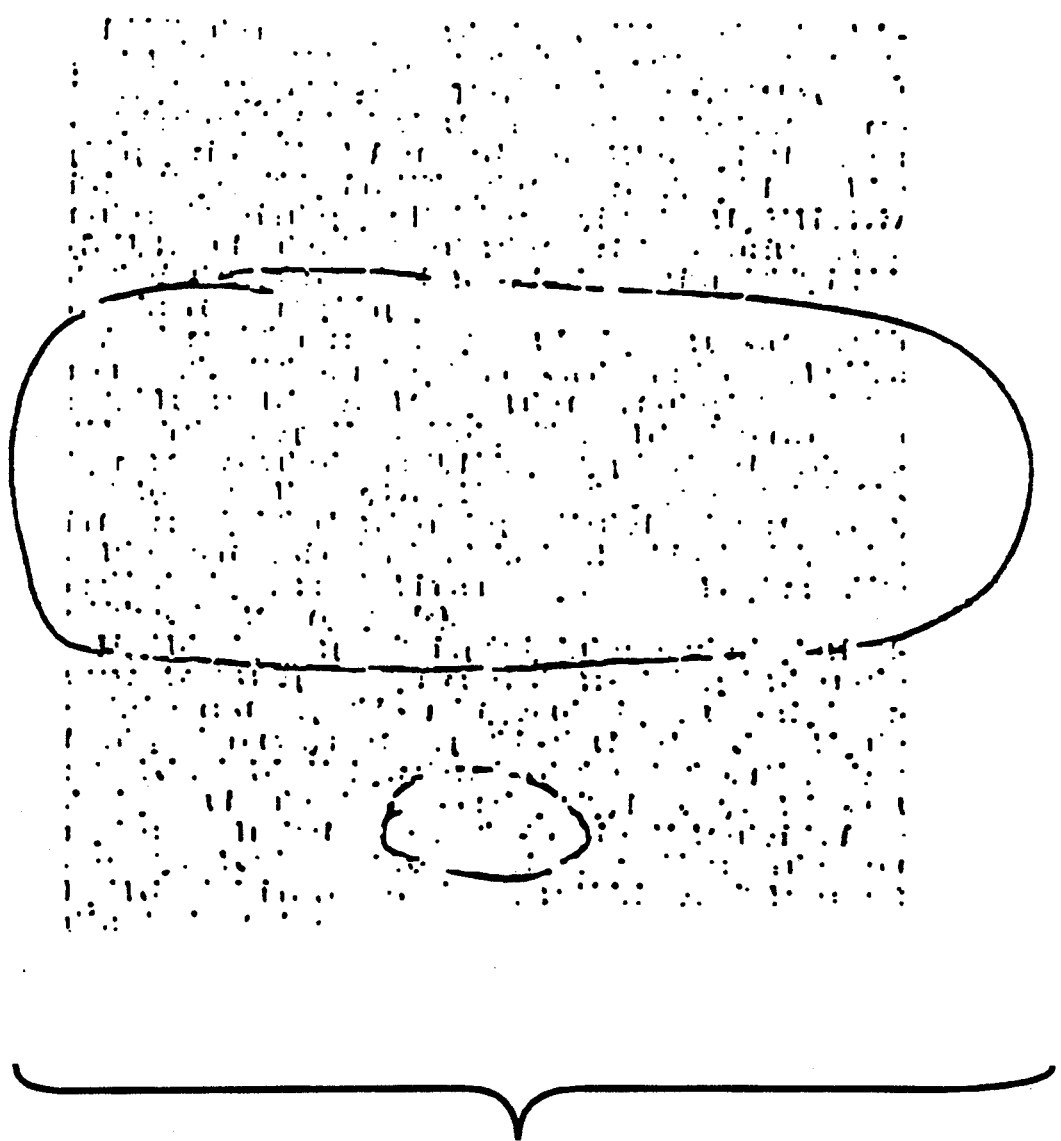
FIG. 9 is an example of a fifth image formed by the indirect hand markup detection method of FIG. 3, the fifth image resulting from XORing the fourth image of FIG. 8 with the first image of FIG. 5.
Figure 10:
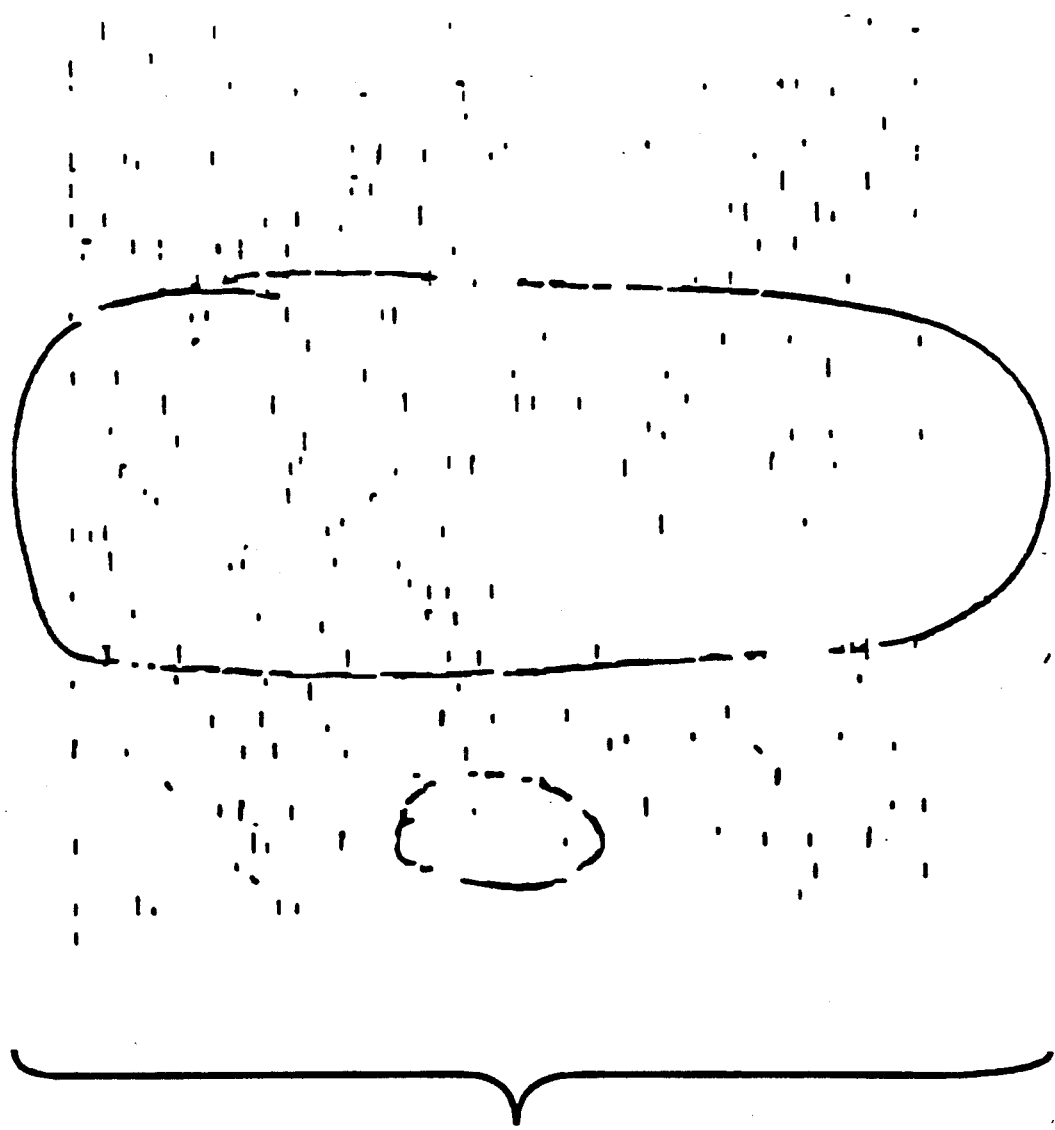
FIG. 10 is an example of a sixth image formed by the indirect hand markup detection method of FIG. 3, the sixth image resulting from an UNION of OPENINGS from the fifth image of FIG. 9.
Figure 11:
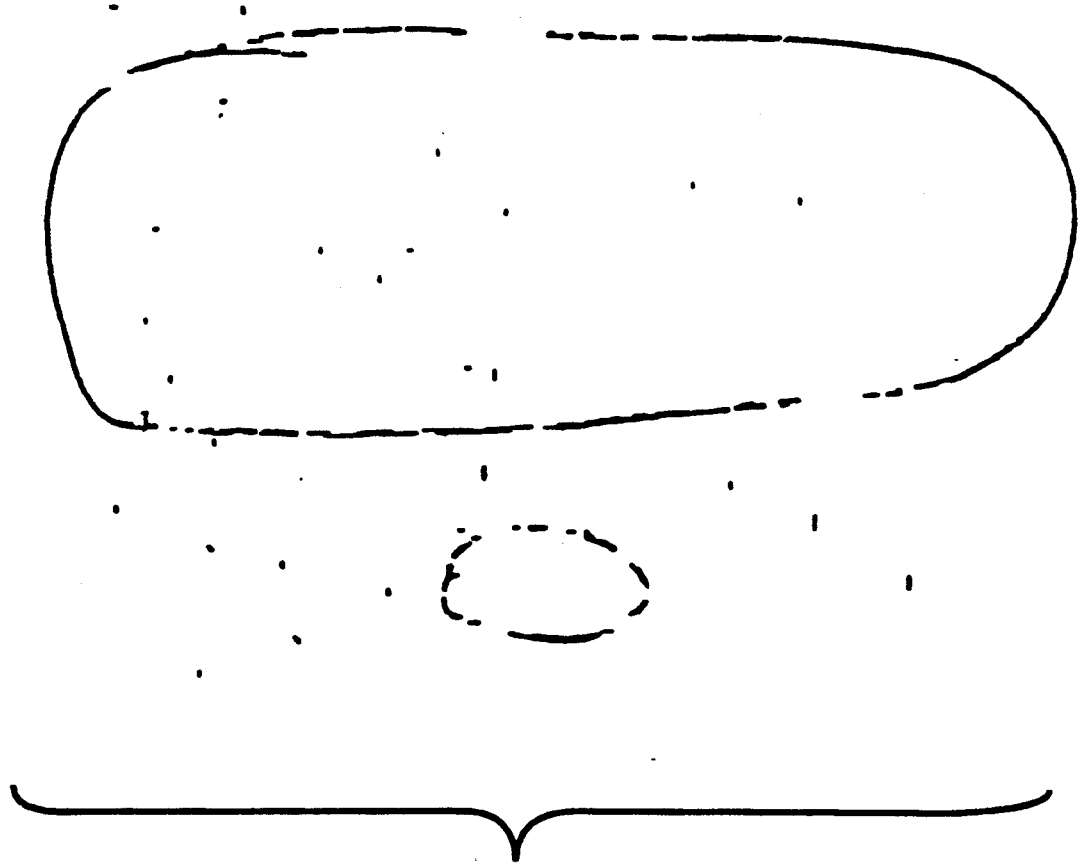
FIG. 11 is an example of a seventh image formed by the indirect hand markup detection method of FIG. 3, the seventh image resulting from morphological OPENINGS of the sixth image of FIG. 10.
Figure 21:
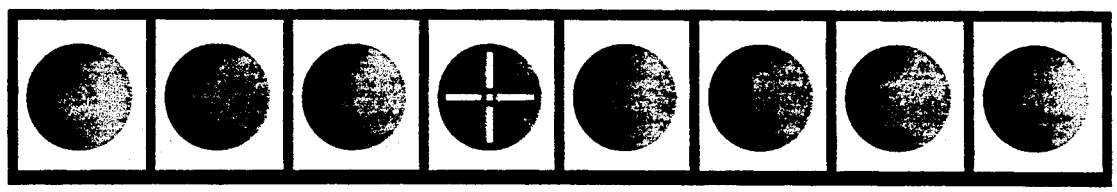
FIG. 21 exemplifies a horizontal structuring element of length 8.
Figure 23:
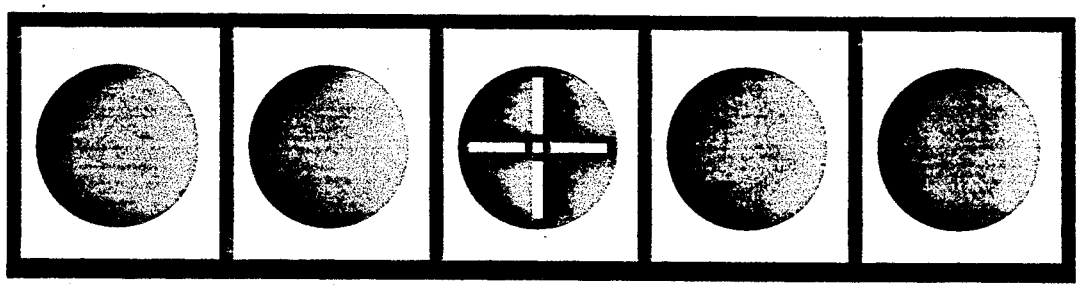
FIG. 23 exemplifies a horizontal structuring element of length 5.
Figure 22:
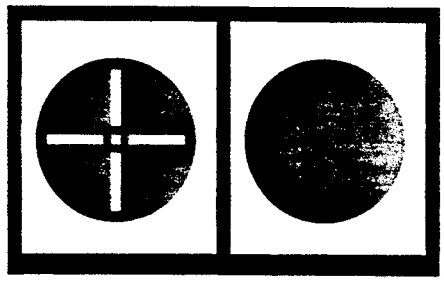
FIG. 22 exemplifies a horizontal structuring element of length 2.
Figure 24:
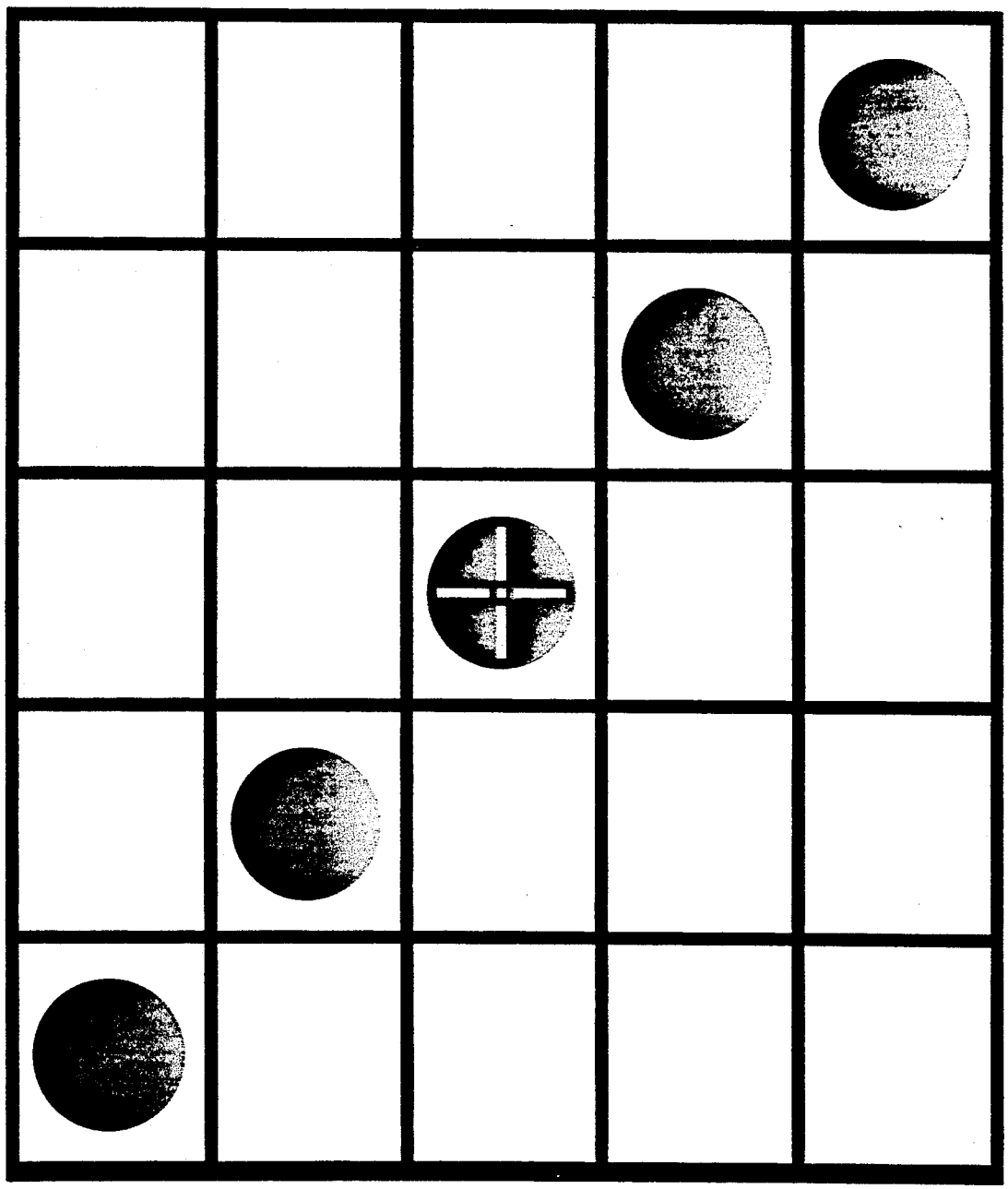
FIG. 24 exemplifies a 5×5 structuring element with ON pixels running diagonally from the lower left corner to the upper right corner.
Figure 25:
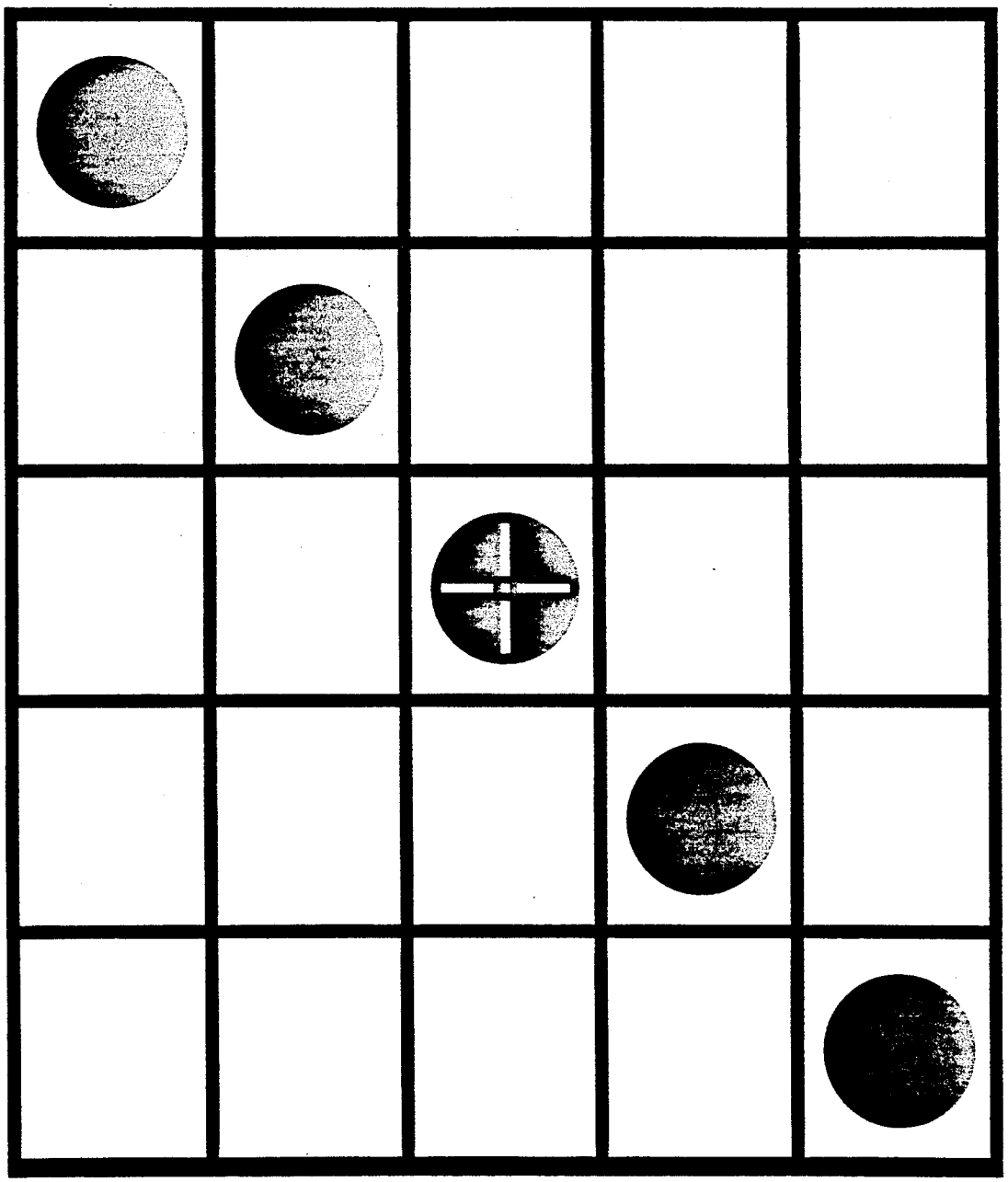
FIG. 25 exemplifies a 5×5 structuring element with ON pixels running diagonally from the upper left corner to the lower right corner.
Figure 26:
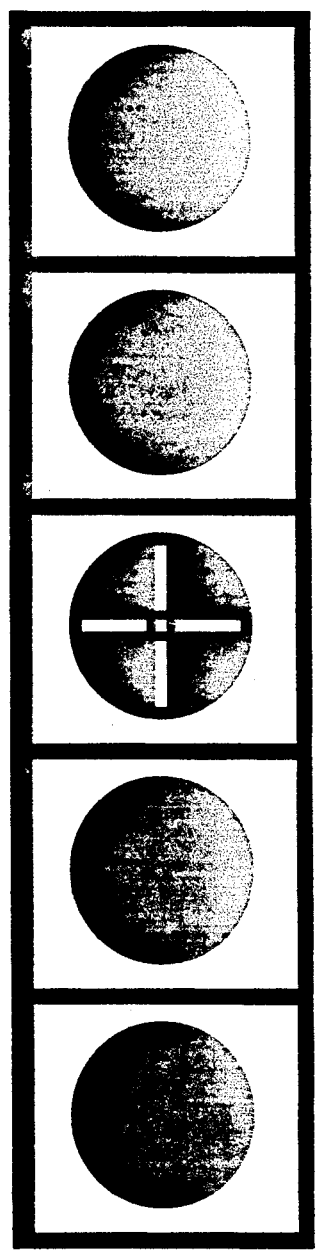
FIG. 26 exemplifies a vertical structuring element of length 5.
Figure 27A:
FIGS. 27A-H exemplify a set of eight structuring elements of various configurations, each of length 9.
Figure 27B:
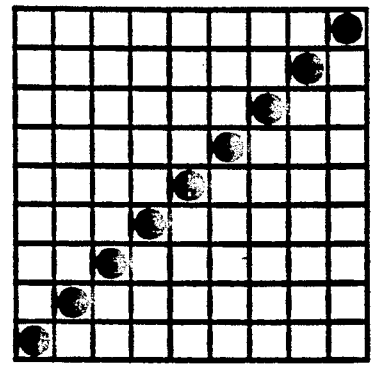
Figure 27C:
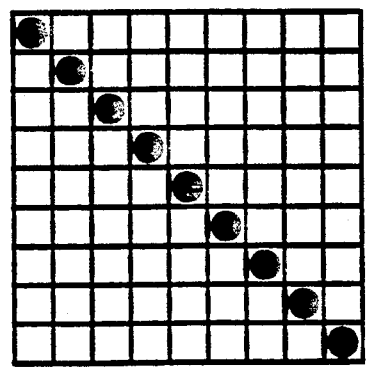
Figure 27D:
Figure 27E:
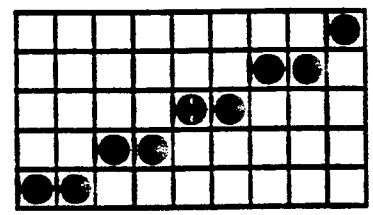
Figure 27F:
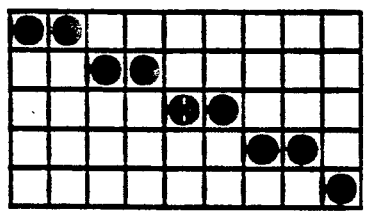
Figure 27G:
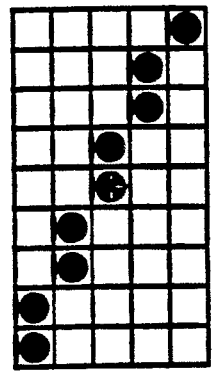
Figure 27H:
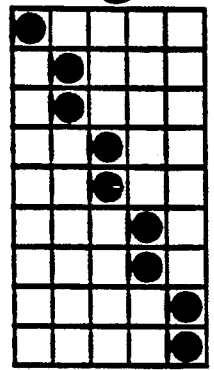

An indirect approach to the identification of hand markup lines involves removing all print from the document image except the markup lines. The indirect approach shown by the steps in FIG. 3 begins in step 30 by scanning a first image, shown in FIG. 5, at 150 pixel per inch. The scanned first image of FIG. 5 can be created, for example, by scanning at 150 pixels/inch or by scanning at 300 pixels/inch then reducing by a factor of 2 with a threshold of 2. The second image shown in FIG. 6 is formed by CLOSING the first image of FIG. 5 with a first horizontal structuring element such as the structuring element of length 8 shown in FIG. 21. Other structuring element orientations can also be used, but the horizontal orientation is most effective in CLOSING up curves and spaces between characters. The CLOSING operation in step 32 identifies regions of high curvature in the first image. The result of the CLOSING operation of step 32 (FIG. 6) and the first image of step 30 (FIG. are XORed at the XOR gate 34 shown in FIG. 3. The result of the XOR is shown in FIG. 7 as a third image which includes only those pixels that were added by the CLOSING operation of step 32. Most of those pixels are expected to be near lines that have high curvature since lines with low curvature should not generate many such pixels. A fillClip operation on the third image of FIG. 7 is segmented into two steps in FIG. 3, namely DILATING the third image in block 36 followed by logically ANDing the result of the DILATION with the first image in step 8. Specifically, the third image of FIG. 7 is DILATED in step 36 with a solid 3×3 structuring element. The DILATED third image is then ANDed with the first image in step 38 forming the fourth image of FIG. 8. The fillClip process fills back the lines of the document that generated the high curvature pixels in FIG. 6. In order to completely fill back the lines of the document as shown in FIG. 8, the fillClip operation can be iterated more than once. Alternatively, the third image of FIG. 7 could be sequentially DILATED with a solid 3×3 structuring element, thence logically ANDing the result of the DILATION with the first image of FIG. 5 to produce a fourth image as shown in FIG. 8. The fourth image of FIG. 8, output from AND gate 38, is then XORed in gate 40 with the first image of FIG. 5 from step 30, forming a fifth image as shown in FIG. 9. In order to strengthen the markup lines and eliminate background noise, many alternative morphological processes can be used to obtain the fifth image shown in FIG. 9. Next in step 42 a UNION of OPENINGS of the fifth image of FIG. 9 with a set of structuring elements, specifically with a set of four structuring elements as shown in FIGS. 23-26 is performed. The morphological operation involves OPENING the fifth image of FIG. 9 by each of the structuring elements in turn, then taking a UNION of the results, forming a sixth image shown in FIG. 10 with reduced noise, observed as containing generally thin vertical lines, wherein every pixel in FIG. 10 belongs to a run of 5 pixels in at least one of the four orientations of the structuring elements shown in FIGS. 23-26. The background noise is further reduced by OPENING the sixth image of FIG. 10 in step 44 with a second horizontal structuring element of length 2 as shown in FIG. 22, forming the seventh image of FIG. 11. At this point, the background noise is sufficiently reduced to allow a number of alternatives for continued image processing, such as CLOSING the seventh image with a sequence of structuring elements to close up the small gaps in the markup lines, followed by small openings to remove the background noise. In step 46 the seventh image is reduced by a factor of 4, i.e., from 150 pixels/inch to 38 pixels/inch, using two threshold reductions of 2× with threshold 1 for each reduction, producing an eighth image as shown in FIG. 12. Next, the eighth image of FIG. 12 is CLOSED in step 48 in sequence with the fourth structuring elements shown in FIGS. 23-26, forming a ninth image as shown in FIG. 13. Some of the breaks in the curves of the eighth image of FIG. 12 have now been closed in the ninth image of FIG. 13. In step 50, a UNION of the ninth image with the OPENINGS of the same set of four structuring elements shown in FIGS. 23-26 results in a tenth image free from most background noise as shown in FIG. 14. The tenth image of FIG. 14 is reduced in step 52 by a factor of 2, forming an eleventh image as shown in FIG. 15. A bounding box fill is performed on the eleventh image of FIG. 15 in step 54, forming the twelfth image of FIG. 16. The twelfth image in FIG. 16 depicts a solid bounding box mask which is expanded as shown in step 56 to full scale, then logically ANDed with the first image (of FIG. 5) from step 30, in AND gate 58, wherein the process of image markup detection is completed at step 60.

VI. Topological Methods

Figure 36:
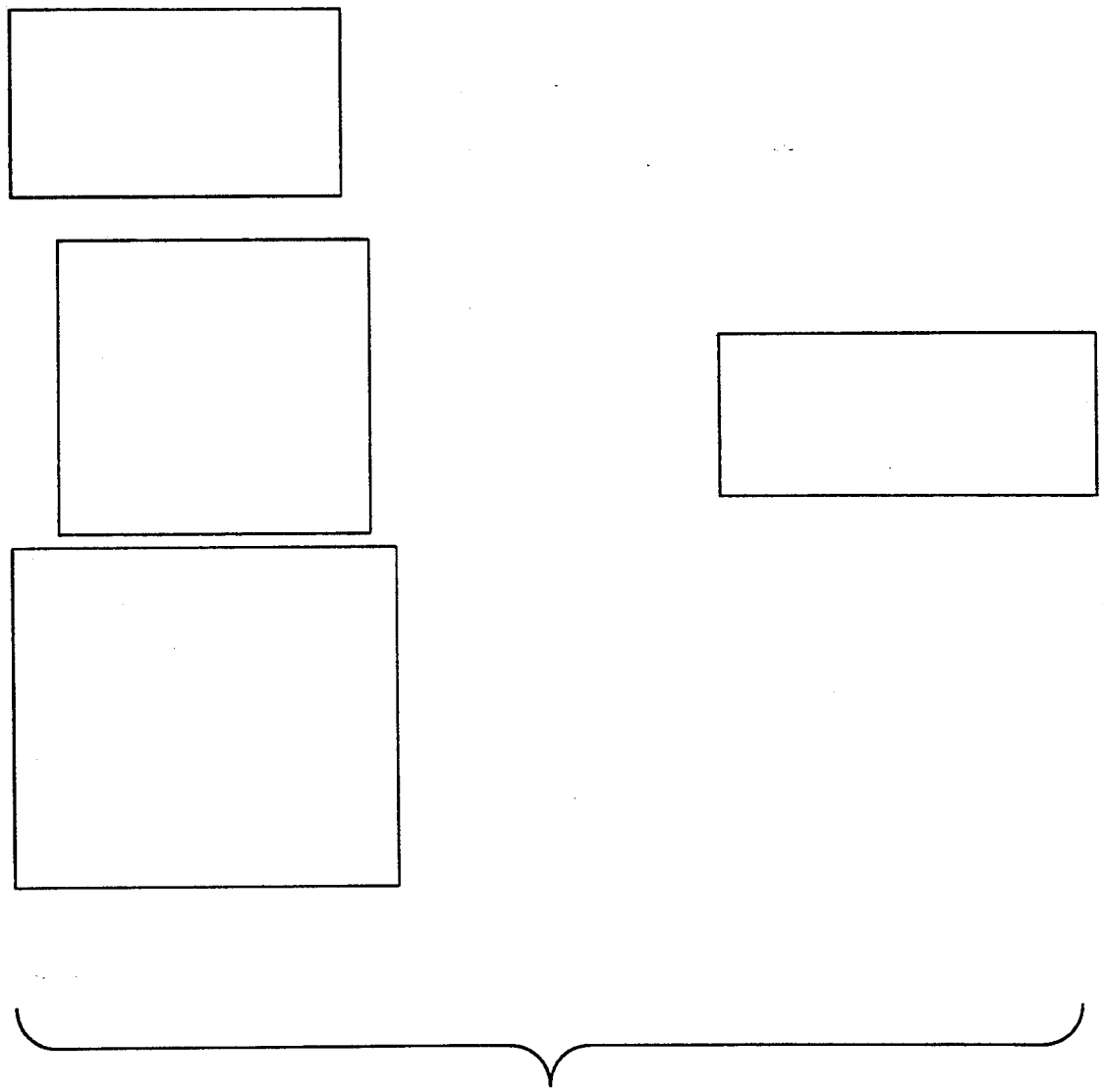
FIG. 36 is an example of a second image of the second indirect approach for hand markup detection.
Figure 37:
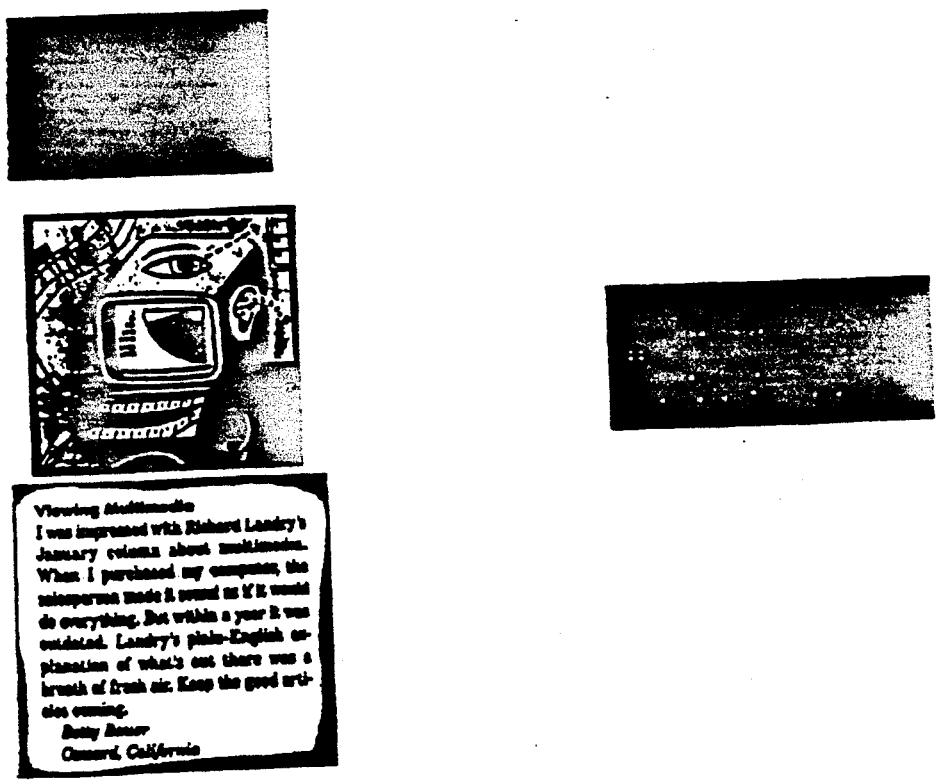
FIG. 37 is an example of a third image of the second indirect approach for hand markup detection.
Figure 38:
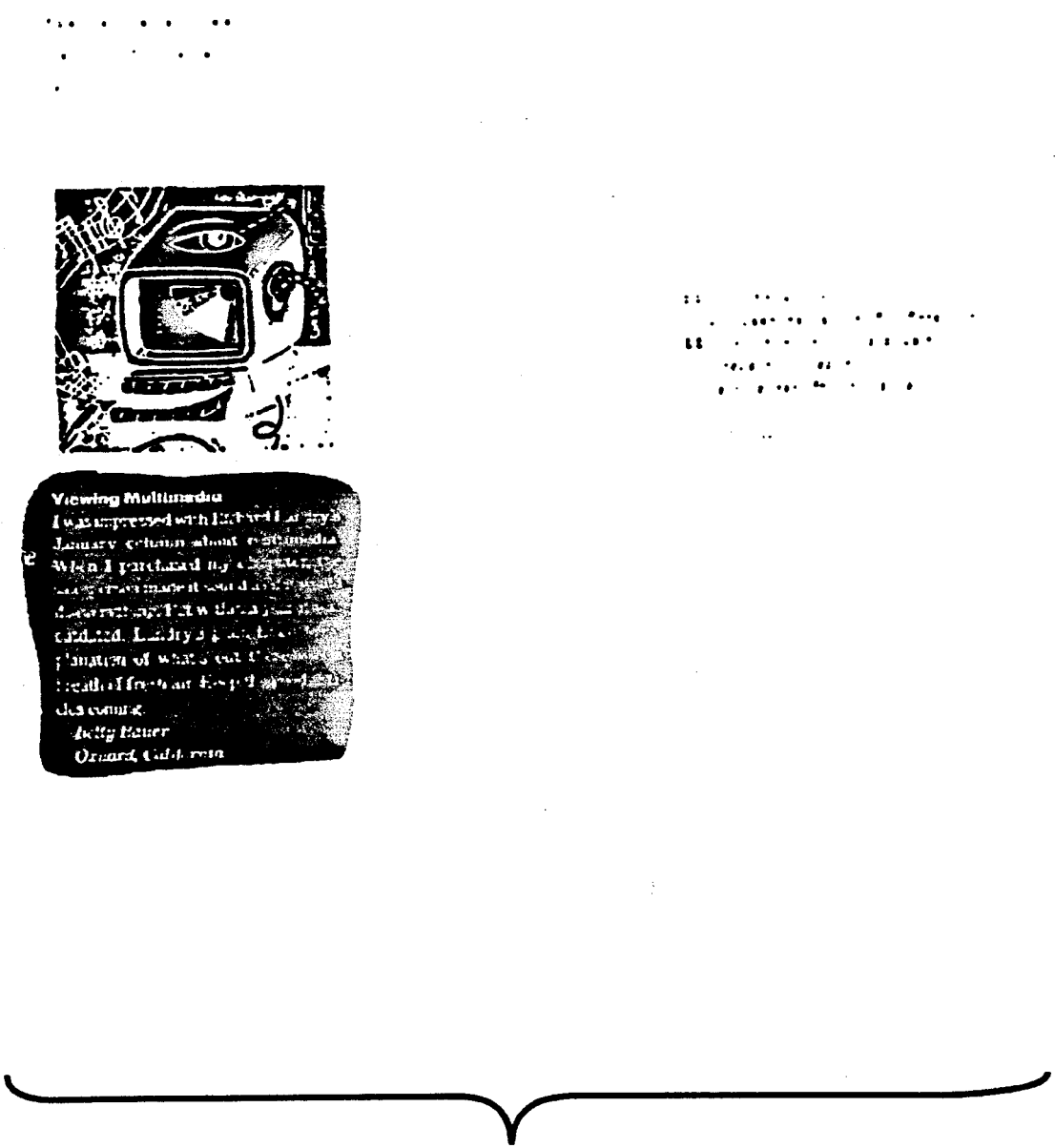
FIG. 38 is an example of a fourth image of the second indirect approach for hand markup detection.

Another preferred embodiment of a method for extraction of the contents of a closed circled region includes extracting handwritten marks at full resolution as shown in FIG. 35 (which is the same result as FIG. 33 of the previously described embodiment). In FIG. 36, the bounding boxes of the connected components have been obtained. For efficiency and to prevent interaction between different parts, each subimage is extracted and handled separately. FIGS. 37-42 show results at intermediate stages of processing, where the subimages have been put together in their original location forming a composite image. In FIG. 37, each subimage has been edge-filled (in a first edge-fill) by doing a flood fill from the edges for each subimage. If the hand mark is closed, the fill will not penetrate the interior. Note that two of the hand "circles" are opened, one is closed, and the graphics subimage is acting like a closed circle. In FIG. 38, each subimage is inverted (in a first, edge-fill invert). If the hand mark contour is open, there will be little left (just the holes of text, for example). If the circle is closed, the contents appear as white on a black background. Note that the previous two steps can be used to decide whether a closed contour exists by testing for the number of ON pixels compared to the area of contour. If the ON pixels occupy a significant fraction of the area (for example, more than 30%), then the contour is closed. Alternatively, if after a small EROSION there are no ON pixels left, the contour is open.

Figure 39:
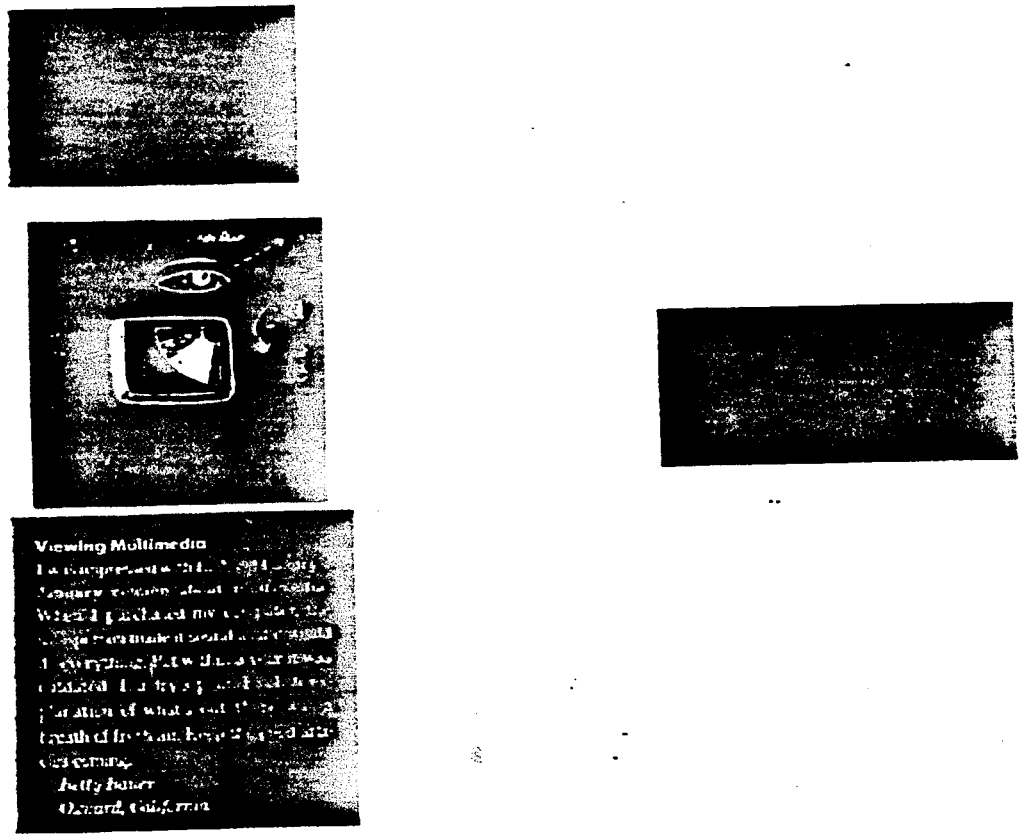
FIG. 39 is an example of a fifth image of the second indirect approach for hand markup detection.
Figure 40:
FIG. 40 is an example of a sixth image of the second indirect approach for hand markup detection.

The contents of the closed contour can be extracted in several ways. For example, each inverted subimage can be edge-filled (in a second edge-fill) as shown in FIG. 39. A solid subimage of ON pixels results for open contours, whereas the edge-fill just fills the exterior part of the closed contours. FIG. 40 shows each subimage inverted (in a second edge-fill invert) whereby the interior is extracted. The two open contours have no interior, whereas the closed contour subimages yield the contents shown. Since the graphic subimage appeared as a closed contour, its non-zero contents also are displayed. The basic operation of content extraction is edge-fill/invert, which is a topological operation extracting the interior ON pixels within a closed contour, noting that the shape of the various image components is not important.

Figure 44:
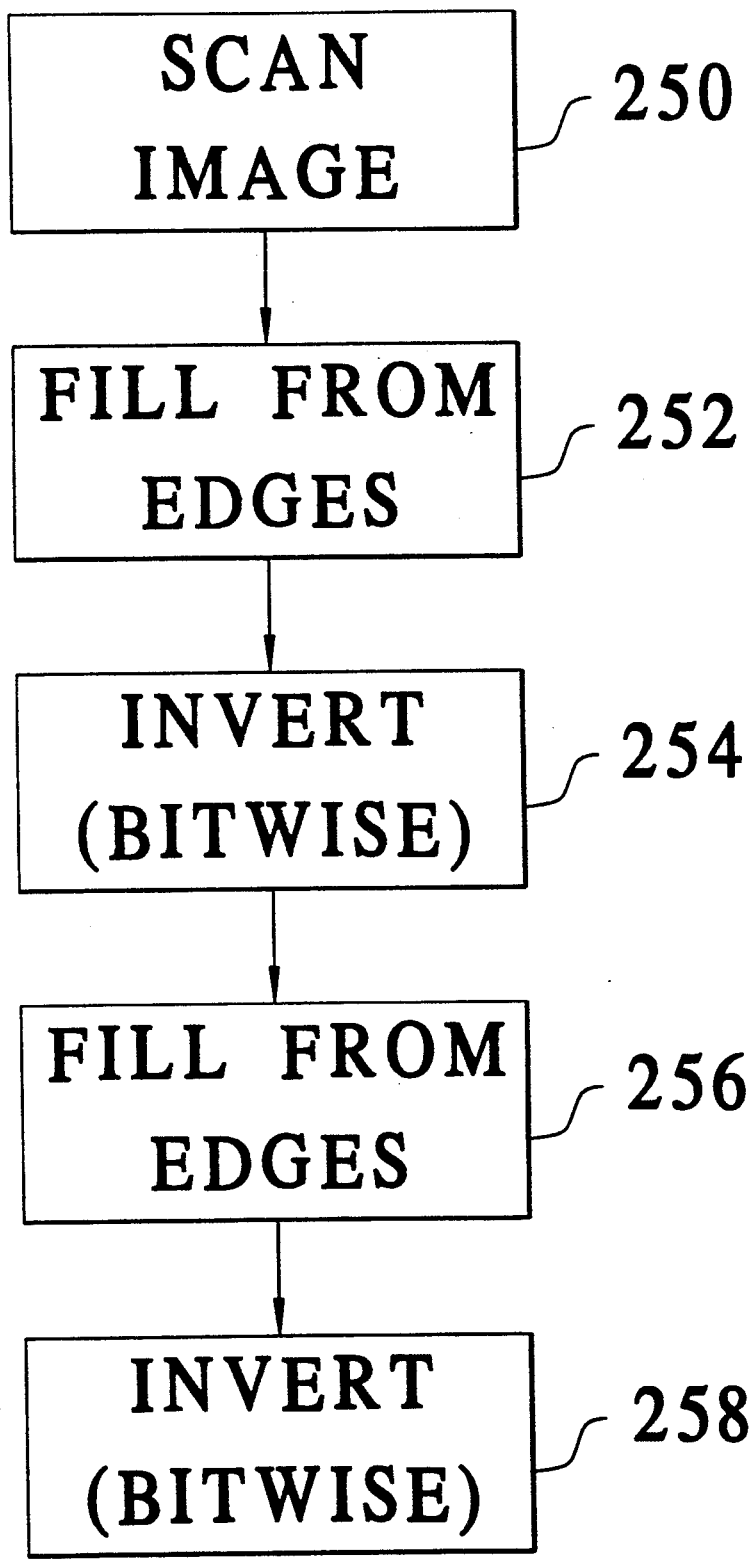
FIG. 44 is a flowchart of a topological method for extraction of regions of a document image encircled by non-transparent hand marks.

Another topological method for extracting the contents of closed circled region (shown in FIG. 44), includes: scanning a document image in step 250; filling the document images from the edges in step 252 (which fills the whole image except enclosed regions); bitwise inverting the image in step 254 so that only the enclosed regions are filled; filling from the edges in step 256; and bitwise inverting the image in step 258, resulting in an image with only hand drawn circled regions filled. The first edge-fill operation is provided to exclude machine made encircled regions.

Figure 45:
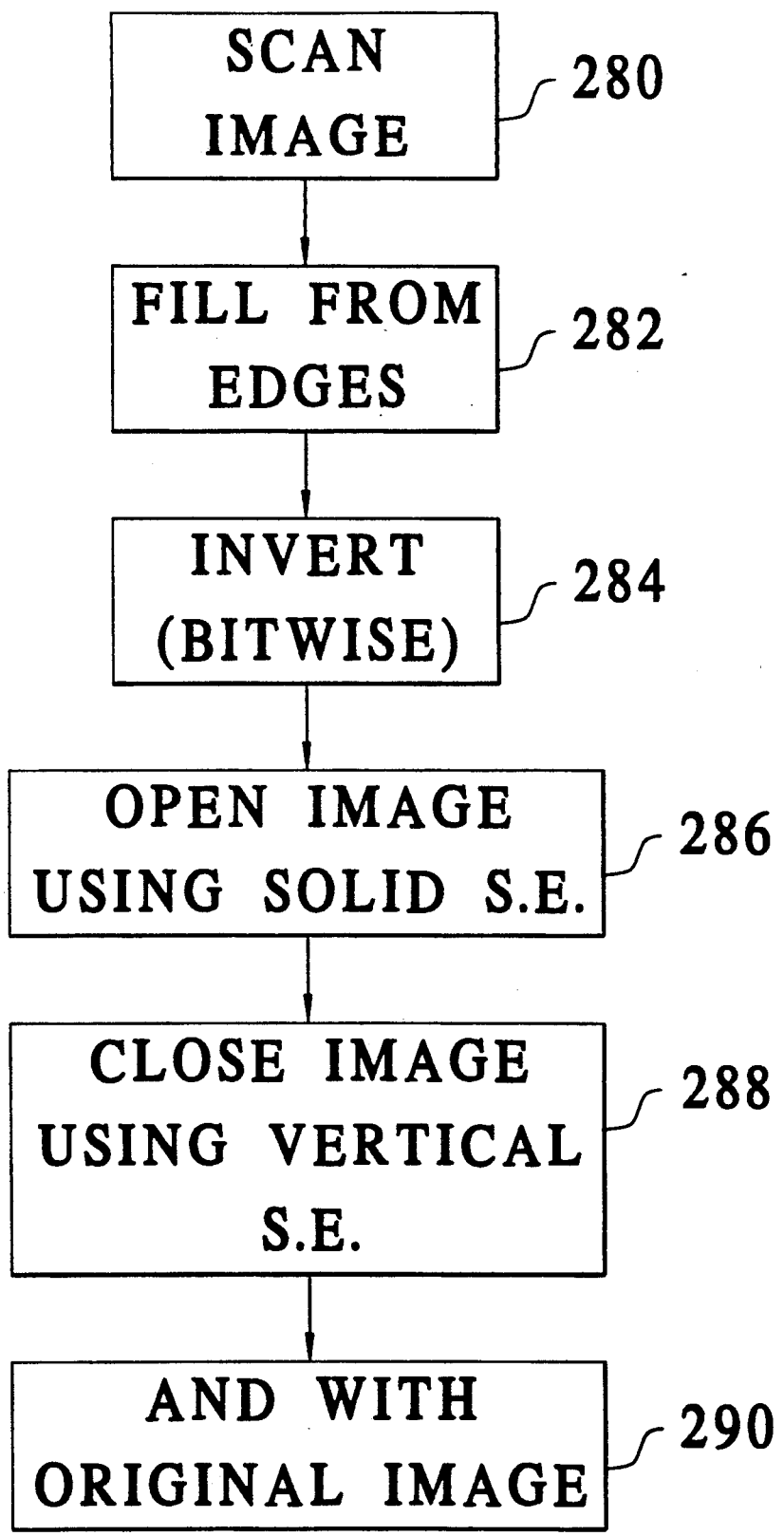
FIG. 45 is a flowchart of a semi-topological method for extracting regions of a document image encircled by non-transparent hand marks.

A semi-topological method for extracting the contents of a closed circled region is shown in FIG. 45. The method includes: scanning a document image in step 280; filling the document image from the edges in step 282; bitwise inverting the image in step 284; OPENING the image using a solid structuring element in step 286; CLOSING the image using at least one vertical structuring element in step 288; and logically ANDing the CLOSED image with the original image scanned in step 290, resulting in an image which includes only those regions which have been hand drawn as circles.

Script used for producing the images shown in FIGS. 36-40 when starting with the image shown in FIG. 35 is found in APPENDIX C.

Figure 41:
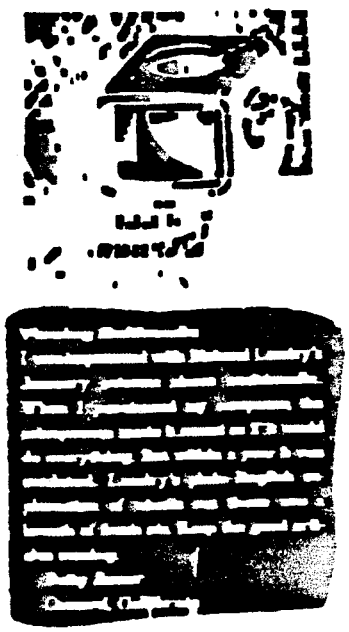
FIG. 41 is an example of the FIG. 38 image the second after an OPENING operation is performed on that image.
Figure 42:
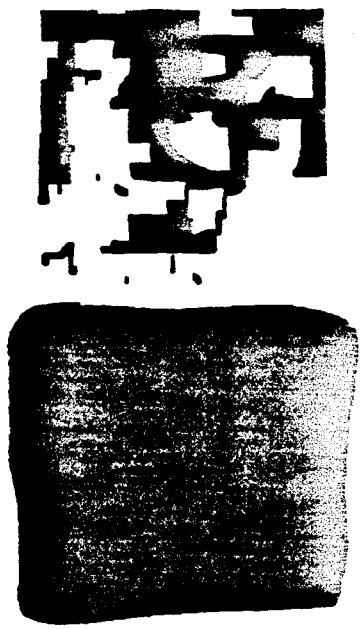
FIG. 42 is an example of the FIG. 41 image after a CLOSE operation is performed on that image.

An alternative to the second edge-fill/invert procedures as described above as as shonw in FIGS. 39 and 40, is as follows. After the first edge-fill/invert, there are noise pixels from inner loops of characters remaining in the regions with open circles. These can be eliminated using an erosion or, preferably, an opening. FIG. 41 shows the result after an opening. Selecting only the non-images; i.e., those whose contours are closed (as described in the first edge-fill invert above) the result, in FIG. 41, is that there are now only two subimages. Then each subimage can be closed with a SE large enough to convert the background text to ON pixels, so that the resulting bitmap is a region of solid ON pixels. After closing using a SE that corresponds to 0.13 inch in the original image (the size can vary), the result in FIG. 42 is obtained in two ways:

The procedure follows:
(a) AND this "mask" with the original image, to extract the text. If this is done, a few pixels from the hand-drawn contour will typically also be included. The reason is that the closing operation will grab a few of the innermost pixels of this boundary.

Figure 43:
FIG. 43 is an example of the FIG. 42 image after an EROSION operation is performed on that image.

(b) Before ANDing the "mask" with the original image, first erode it with a small SE (say, 3×3). This should prevent if from overlapping with the hand-drawn contour; thus, (b) is a better method than (a). The result is shown in FIG. 43.

The script file of APPENDIX D created the images shown in FIGS. 36-38, and FIGS. 41-43 (the alternate method, described above.)

The addBorderPixar and removeBorderPixar operations are of APPENDIX D a small implementation detail to prevent problems at the image boundaries in the CLOSING operation. Since there is always a border of white space, there are no image boundary issues.

cl VII. Image Hand Mark Detection Device

Figure 4:
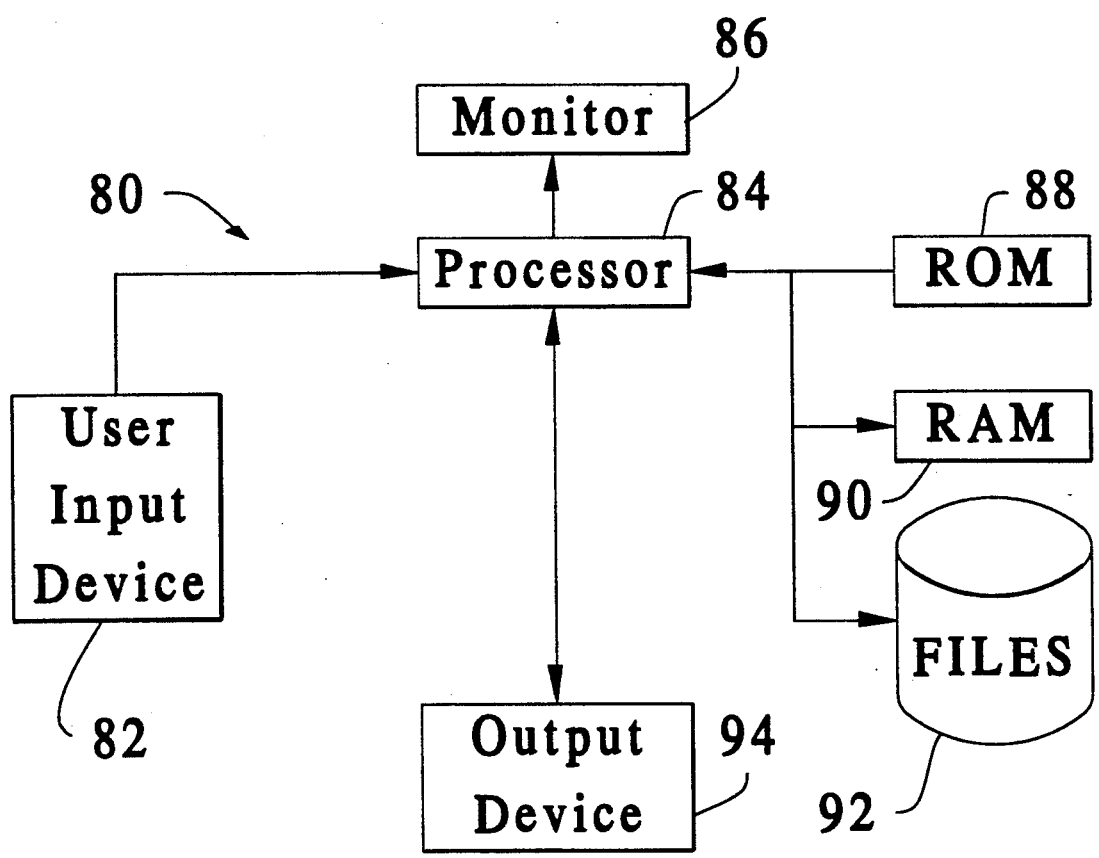
FIG. 4 is a block diagram of a preferred embodiment of an apparatus which identifies and extracts hand markup lines in an optically scanned first image according to the invention.

The image hand mark detection device 80 of FIG. 4 includes, for example, a user input device 82, processor 84, monitor 86, read only memory 88, random access memory 90, files 92 and an output device 94. Device 80 represents any number of automatic devices for altering a document image such as a computer system, a facsimile system or a photocopying system. The user input device, 82 represents any user input device such as a keyboard, optical scanner electronic scanner, photocopier or facsimile machine. Once a hand marked document image (not shown) is read by the user input device 82, the document image is processed by processor 84 to extract the hand marks or the contents desired in accordance with the methods described herein. The processor 84 operates by way of instructions provided by ROM 88 and information provided by RAM 90 whereby access to files 92 can be obtained. The results of the extraction of the hand marked document image segments can be displayed in monitor 86 or output to output device 94 (which represents any output device for outputting a document image such as a facsimile machine, photocopier, printer or CRT display).

The previously described apparatus and methods have shown how to identify and extract markup lines from a source image, using characteristic features of both the markup lines and the other print in the source image. The current invention has used only morphological operations and threshold reductions wherein all morphological operations are translationally invariant and can be performed with both parallel and pipelined architectures, thus affording extremely fast and cost effective implementations.

While the present invention has been described with reference to particular preferred embodiments, the invention is not limited to the specific examples given, and other embodiments and modifications can be made by those skilled in the art without departing from the spirit and scope of the invention as defined in the following claims.

APPENDIX A

```
       * TEXT SCRIPT
   Copyright 1991 Xerox Corp.
*    circle 7.scr
*    4x reduction
*    Extraction by rabbf:
     intl = 1
*    Extraction by edgefill (topology):
     intl = 0
```

```
moveToScale (1)
        *          deskew
pause(" deskew")
deskew(pr1, pr0, 4)
copy(pw0, pr1)
        *          4x reduction
pause(" reduce 4x")
reduceSelV(0, 1, 0, 0, 0, 0, 0, 4)
pixr1 = copyPixr(pr1)
copy(pw0, pr1)
        *          extract hand drawn lines
pause(" get horizontal lines")
dilate(pr2, pr1, stre12v)
copy(pw0, pr2)
open(pr1, pr2, stre120h)
copy(pw0, pr1)
dilate(pr2, pr1, stre13)
copy(pw0, pr2)
        *          identify all lines, and remove the short ones*/
pause(" remove short horizontal lines")
boxes11 = rabb(pr2)
boxes 12 = removeSmallBoxes(boxes11, 30, 2)
displayBoxes(pr3, boxes 12)
copy(pw0, pr3)
        *          select hand written lines
pause(" select hand written lines")
boxes13 = handLineDiscr(pr2, boxes12, 0.010)
displayBoxes(pr3, boxes13)
copy(pw0, pr3)
        *          use pixars to extract the hand marks at full
                   scale
pause(" extract circle at f.s.")
pixar11 = makeEPixar(pr2, boxes 13)
pixar12 = expandPixar(pixar11, 4)
moveToScale(1)
pixr12 = displayPixar(pixar12)
and(pr2, pixr12, pr1)
fillClipSeed(pr3, pr2, pr1)
copy(pw0, pr3)
pause(" now get the contents")
        *          use rabbf to get contents of bounding box
if (int1) {
boxes14 = rabbf(pr3)
pixar21 = makeEPixar(pr3, boxes 14)
pixar22 = makeEPixar(pr1, boxes 14)
subtractPixar(pixar22, pixar22, pixar21)
pixr22 = displayPixar(pixar22)
copy(pw0, pixr22)
```

APPENDIX B

```
        * C CODE SCRIPT
        * Copyright 1991 Xerox Corp.
        /*    handLineDiscr */
#define  MIN_ASPERITY_LIMIT      4.0    /* min for line */
#define  LOW_ASPERITY_LIMIT     25.0    /* handle differently */
```

```
#define   TOLERANCE_ANGLE        0.010  /*   tolerance angle (in radians) al-
                                            lowed
                                         *   for the machine line */
#define TOLERANCE_LINES           2     /*   for low-asperity segments */
/***********************************************************************
 **********        Hand Line Discrimination        **********
 ***********************************************************************/
*                    Copyright 1991 Xerox Corp.
/*
 * handLineDiscr():   takes a pixr, a boxes structure, and a tolerance
 *                    angle factor.
 *            we assume the pixr has been deskewed, relative to some
 *               text, that may (or may not) appear in the pixr.
 *               The pixr may include only extracted horizontal or
 *               vertical lines, or may have everything.
 *            the boxes structure gives rects of either "horizontal"
 *               or "vertical" lines, but not both.
 *            if the input tolerance factor is 0.0, a default is
 *               used.
 *            returns a boxes struct giving locations of the hand
 *               drawn lines, or NULL if there are no lines or on
 *               error.
 */
#ifndef    ANSI
BOXES *
handLineDiscr (pixr, boxes, tolerance)
Pixrect         *pixr;
BOXES           *boxes;
double          tolerance;
#else
BOXES *    CDECL
handLineDiscr(Pixrect    *pixr,
              BOXES      *boxes,
              double     tolerance)
#endif     /* ANSI */
{
int         nRect, i, direction, w, h, numPix, area, excess;
double      asperity, asperityHor, asperityVert, ratio;
RN          *rlist, *rnode;
RECTANGL    *rect;
BOXES       *boxesH;
Pixrect     *prSeg;
static char procName[] = "handLineDiscr"

if (!pixr)
            return abortP("source pr not defined", procName, NULL);
        if (!boxes)
            return abortP("boxes not defined", procName, NULL);
        rlist = NULL;
        if (tolerance == 0.0)
            tolerance = TOLERANCE_ANGLE;   /* use default */
        /*   decide if boxes are horizontal or vertical:
             find the box with the largest asperity */
        Nrect = boxes->n;
        asperityHor = 0.0;
        asperityVert = 0.0;
        for (i = 0; i < Nrect; i++)
        {
            rect = boxes->rect[i];
            asperityHor = Max(asperityHor, ((double) rect->w / (double)
            rect->h));
            asperityVert = Max(asperityVert, ((double) rect->h /(double)
            rect->w));
        }
direction = (asperityHor > asperityVert) ? HORIZ : VERT;
        /* extract rects of hand lines */
    for (i = 0; i < Nrect; i++)
    {
```

```
        rect = boxes->rect[i];
        w = rect->w;
        h = rect->h;
        if ((direction == HORIZ && h == 1) || (direction == VERT &&
            w == 1)) continue;        /* straight and narrow machine
                                          made */
        if (direction == HORIZ)
            asperity = (double) w / (double) h;
        else  /* vertical */
            asperity = (double) h / (double) w;
        if (asperity < MIN_ASPERITY_LIMIT)  /* not a line segment */
            continue;
        if ((prseg = rectOfPixrect(pixr, rect)) == NULL)
            return abortP("prseg not made", procName, NULL);
        numPix = numberPr(prseg, PIXELS);
        area = w * h;
        ratio = (double) numPix / (double) area;
        if (direction == HORIZ) {
            if (asperity < LOW_ASPERITY_LIMIT)
                excess = w * (h - TOLERANCE_LINES) - numPix;
            else
                excess = w * (h - tolerance * w) - numPix;
        }
        else {   /* vertical */
            if (asperity < LOW_ASPERITY_LIMIT)
                excess = h * (w - TOLERANCE_LINES) - numPix;
            else
                excess = h * (w - tolerance * h) - numPix;
        }
        if (excess > 0)  /* hand drawn; add rect to list */
        {
            if ((rnode = createRectNode(rect)) == NULL)
                return abortP("rnode not made", procName, NULL);
            rlist = addToHeadRL(rlist, rnode);
        }
        destoryPixr(prseg);
    }
    if (!rlist)
        return abortP("no hand written lines identified", procName, NULL);
    if ((boxesH = RLToBoxes(rlist)) == NULL)
        return abortP("boxesH not made", procName, NULL);
    /* clean up */
    destroyRL(rlist);
```

APPENDIX C

```
*TEXT SCRIPT
* Copyright 1991 Xerox Corp.
 *  use topological method to get contents of the hand
marks;
 *   this only works if the marks form closed curves pause ("get contents:  first fill/invert...")
     boxes14 - rabbf(pr3)
*    displayBoxes(pr2, boxes14)
*    copy(pw0, pr2)
     pixar21 = makeEPixar(pr1, boxes14)
     pixar22 = edgeFillPixar(pixar21)
*    pixar22 = displayPixar(pixar 22)
*    copy(pw0, pixr22)
     invertPixar(pixar22)
     pixr22 = displayPixar(pixar22)
```

```
copy(pw0, pixr22)

pause (" and fill/invert again")
   pixar23 = edgeFillPixar(pixar22)
*    pixr23 = displayPixar(pixar23)
*    copy(pw0, pixr23)
   invertPixar(pixar23)
   pixr23 = displayPixar(pixar23)
   copy(pw0, pixr23)
```

APPENDIX D

```
*  SEMI-TOPOLOGICAL
   *  Copyright 1991 Xerox Corp.
   *  use semi-topological method to get contents of the
hand marks;
   *  this only works if the marks form closed curves
   pause (" get contents: first fill/invert...")
   boxes 14 = rabbf(pr3)
*    displayBoxes(pr2, boxes14)
*    copy(pw0, pr2)
   pixar21 = makeEPixar(pr1, boxes14)
   pixar22 = edgeFillPixar(pixar21)
*    pixr 22 = displayPixar(pixar22)
*    copy(pw0, pixr22)
   invertPixar(pixar22)
   pixr22 = displayPixar(pixar22)
   copy(pw0, pixr22)

pause ("open, close, erode, and with the original")
   openPixar(pixar22, pixar22, strel6h, strel6v)
   pixr22 = displayPixar(pixar22)
   copy(pw0, pixr22)
   pixar23 = addBorderPixar(pixar22, 10, 0)
   closePixar(pixar23, pixar23, strel20h, strel20v)
   pixr23 = displayPixar(pixar23)
   copy(pw0, pixr23)
   erodePixar(pixar23, pixar23, strel3h, strel3v)
   pixr23 = displayPixar(pixar23)
   copy(pw0, pixr23)
   pixar24 = removeBorderPixar(pixar23, 10)
   andPixar(pixar24, pixar21)
   pixr24 = displayPixar(pixar24)
   copy(pw0, pixr24)
```

What is claimed is:

1. A method for processing a scanned first image in a digital computer to identify a location of non-transparent hand marks and hand marked regions, the method comprising the steps of:

(a) performing a plurality of morphological OPENING operations on the first image using a first set of structuring elements, each OPENING operation using a different structuring element from said first set, and taking a UNION of the results of said plurality of OPENING operations to form a second image; and (b) creating bounding boxes around mark-up lines in the second image, said bounding boxed identifying the hand marked regions.

2. The method as recited in claim 1, further comprising decreasing the resolution of said first image prior to performing step (a).

3. The method as recited in claim 2, wherein step (a) further comprising the steps of:

reducing an intermediate image formed by taking the UNION of said plurality of OPENING operations by two times, using a threshold of 1;

performing a second plurality of morphological

OPENINF operations on the intermediate using the first set of structuring elements; and taking a UNION of the results of said second plurality of OPENING operations to form said second image.

4. The method as recited in claim 1 wherein some of the bounding boxes having less than a predetermined size are classified as small bounding boxes, and wherein the small bounding boxes are eliminated.

5. A method for processing a scanned first image in a digital computer to identify a location of non-transparent hand marks and marked regions, the method comprising the steps of:
   (a) CLOSING the first image with a first horizontal structuring element, forming a second image;
   (b) XORing the first image with the second image, forming a third image;
   (c) DILATING the third image with a solid square structuring element, ANDing the DILATION of the third image with the first image, forming a fourth image;
   (d) XORing the fourth image with the first image, forming a fifth image;
   (e) performing a plurality of morphological OPENING operations on the fifth image using a first set of structuring elements, each OPENING operations using a different structuring element from said first set, and taking a UNION of the results of said plurality of OPENING operations, forming a sixth image;
   (f) OPENING the sixth image with a second horizontal structuring element, forming a seventh image;
   (g) reducing the seventh image by a first predetermined factor, forming an eighth image;
   (h) CLOSING the eighth image with the first set of structuring elements forming a ninth image;
   (i) performing a plurality of morphological OPENING operations on the ninth image using the first set of structuring elements, each OPENING operation using a different structuring element from said first set, and taking a UNION of the results of said plurality of OPENING operations, forming a tenth image;
   (j) reducing the tenth image by a second predetermined factor, forming an eleventh image;
   (k) filling bounding boxes of the eleventh image, forming a twelfth image;
   (l) expanding the twelfth image to a full scale; and
   (m) ANDing the twelfth image with the first image, extrapolating the hand marked regions.

6. A topological method for processing an image in a digital computer for extraction of regions of a document image entirely encircled by non-transparent hand marks, the method comprising the steps of:
   (a) flood filling the document image from edges of said document image;
   (b) bitwise inverting the flood-filled document image;
   (c) flood filling the inverted document image produced in step (b) from edges of said inverted document image; and
   (d) bitwise inverting the document image produced in step (c).

7. A semitopological method for processing an image in a digital computer for extracting regions of a document image entirely encircled by non-transparent hand marks, the method comprising the steps of:
   (a) flood filling the document image from edges of said document image;
   (b) bitwise inverting the flood-filled document image;
   (c) OPENING the document image produced in step (b) using a solid structuring element of a first predetermined size;
   (d) CLOSING the document image produced in step (c) using a solid structuring element of a second predetermined size; and
   (e) ANDing the CLOSED document image produced in step (d) with the original document image.

8. The method as recited in claim 7 wherein the first predetermined size is a size less than a size of a character.

9. The method as recited in claim 7, wherein the second predetermined size is a size at least as large as a size of a character.

10. The method of claim 7, wherein prior to performing step (e) the CLOSED document image produced in step (d) is ERODED with a structuring element.

11. A method for processing a document image in a digital computer for identification in the document image of hand drawn lines comprising the steps of:
   (a) OPENING the document image using at least one structuring element;
   (b) finding bounding boxes around image units in the OPENED document image produced in step (a); and
   (c) testing the document image produced in step (b) to identify bouding boxes containing hand drawn lines.

12. The method as recited in claim 11 further comprising reducing the document image prior to performing step (a).

13. The method of claim 11, wherein said at least one structuring element used in step (a) is a horizontal structuring element so that horizontal lines are identified in step (c).

14. The method of claim 11, wherein said at least one structuring element used in step (a) is a vertical structuring element so that vertical lines are identified in step (c).

15. The method of claim 11, further comprising the steps of:
   (d) performing a fill operation by using a result of step (c) as a seed and the original image as a clipping mask; and
   (e) XORing a result of step (d) with the original document image so as to remove hand drawn marks from the document.

16. The method of claim 11, wherein said testing performed in step (c) includes comparing an asperity ratio of said bounding boxes to a threshold asperity ratio.

17. The method of claim 11, wherein said testing performing in step (c) includes comparing a fraction of ON pixels in each bounding box with a threshold fraction.

18. A method for processing a document image in a digital computer for identifying hand drawn encircled regions of the document image, the method comprising the steps of:
   (a) performing an OPENING operation on the document image;
   (b) finding bounding boxes of image units in the OPENED document image produced in step (a);
   (c) testing the document image produced in step (b) to identifying hand drawn lines; and (d) performing a fill operation by using a result of step (c) as a seed and the original image as a clipping mask.

19. The method as recited in claim 18, further comprising decreasing the resolution of said document image prior to performing step (a).

20. The method as recited in claim 18 wherein the OPENING operation in step (a) uses horizontal structuring elements.

21. The method as recited in claim 18 wherein the OPENING operation in step (a) uses vertical structuring elements.

22. The method of claim 18, further comprising the steps of:
(e) finding bounding boxes of the encircled hand drawn regions produced in step (d);
(f) extracting the encircled regions from the original document image so as to identify contents of the encircled regions; and
(g) XORing a result of step (d) with a result of step (f) so as to extract the contents of the encircled regions.

* * * * *